United States Patent
Kawauchi et al.

(10) Patent No.: US 8,107,519 B2
(45) Date of Patent: Jan. 31, 2012

(54) EQUALIZER, EQUALIZATION METHOD, PROGRAM AND RECEIVING DEVICE

(75) Inventors: Hidetoshi Kawauchi, Kanagawa (JP); Naoki Yoshimochi, Kanagawa (JP); Ryoji Ikegaya, Tokyo (JP)

(73) Assignee: Sony Corporation, Tokyo (JP)

( * ) Notice: Subject to any disclaimer, the term of this patent is extended or adjusted under 35 U.S.C. 154(b) by 314 days.

(21) Appl. No.: 12/562,384

(22) Filed: Sep. 18, 2009

(65) Prior Publication Data

US 2010/0074318 A1 Mar. 25, 2010

(30) Foreign Application Priority Data

Sep. 19, 2008 (JP) ............................... P2008-240274

(51) Int. Cl.
*H03H 7/30* (2006.01)
*H04B 1/10* (2006.01)

(52) U.S. Cl. ....................................... 375/229; 375/350

(58) Field of Classification Search .................. 375/229, 375/232, 260, 350, 343, 346; 708/322, 323; 455/63, 226.3, 296

See application file for complete search history.

(56) References Cited

U.S. PATENT DOCUMENTS 7,949,040 B2 * 5/2011 Yoshida et al. ............... 375/227

2009/0135931 A1 * 5/2009 Kawauchi et al. ............ 375/260

FOREIGN PATENT DOCUMENTS

JP 2005-150839 6/2005

* cited by examiner

*Primary Examiner* — Khai Tran

(74) *Attorney, Agent, or Firm* — Frommer Lawrence & Haug LLP; William S. Frommer

(57) ABSTRACT

An equalizer includes: a replica generation means for generating a replica of a multipath component by applying an adaptive filter to a received signal; a removal means for generating a multipath-component removed signal from which the multipath component has been removed by subtracting the replica from the received signal; a correlation value calculation means for calculating a correlation value between the received signal and the replica; a power value calculation means for calculating a power value of the replica; a determination means for determining whether the replica is the replica of the multipath component based on the correlation value and the power value; and a selection means for outputting the multipath-component removed signal when it is determined that the replica is the replica of the multipath component, and outputting the received signal when it is determined that the replica is not the replica of the multipath component.

14 Claims, 17 Drawing Sheets

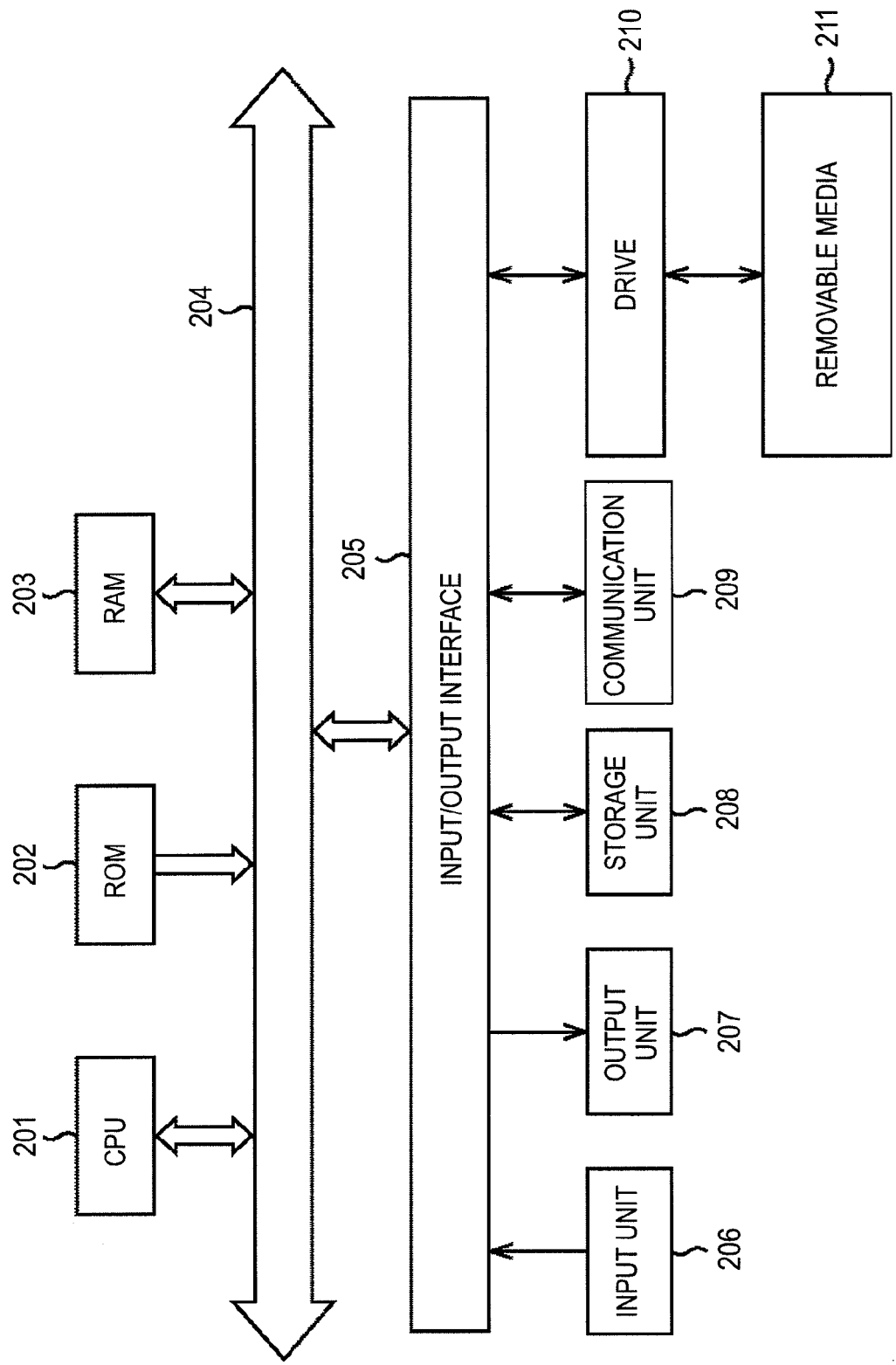

EQUALIZER, EQUALIZATION METHOD, PROGRAM AND RECEIVING DEVICE

BACKGROUND OF THE INVENTION

1. Field of the Invention

The present invention relates to an equalizer, an equalization method, a program and a receiving device, and particularly, relates to an equalizer, an equalization method, a program and a receiving device capable of certainly removing multipath interference by using a replica of a multipath component.

2. Description of the Related Art

Under an environment in which multipath occurs, the amplitude and the phase of a signal differs at the time of transmission and at the time of reception under the influence of multipath when the signal is transmitted. Accordingly, it is necessary to perform signal equalization at the reception side so that the amplitude and the phase of a received signal become equal to the transmitted signal.

As a common method of equalizing the received signal which has received the multipath inference in a time domain, a method of removing a multipath component by generating a replica of the multipath component and subtracting the generated replica from the received signal is known.

FIG. 1 is a diagram showing a configuration of an equalizer of related art which removes the multipath component from the received signal.

An equalizer 1 includes a variable coefficient FIR filter 11, a delay unit 12, a subtraction unit 13 and a variable coefficient IIR filter 14. A time-domain received signal obtained by A/D (Analog/Digital) conversion processing, synchronous processing and the like in a former-stage circuit is inputted to the variable coefficient FIR filter 11 and the delay unit 12.

The variable coefficient FIR filter 11 generates a replica of a multipath component (hereinafter, referred to as an advancing wave) arriving earlier than a dominant wave by performing filtering using a coefficient generated by a not-shown coefficient update circuit. The advancing-wave replica generated by the variable coefficient FIR filter 11 is supplied to the subtraction unit 13.

The delay unit 12 delays the time-domain received signal so that the advancing wave of the time-domain received signal and the advancing-wave replica outputted from the variable coefficient FIR filter 11 are supplied to the subtraction unit 13 at the same timing, outputting the signal. The time-domain received signal outputted from the delay unit 12 is supplied to the subtraction unit 13.

The subtraction unit 13 removes or suppresses the advancing-wave component included in the time-domain received signal by subtracting the advancing-wave replica generated by the variable coefficient FIR filter 11 from the time-domain received signal supplied from the delay unit 12. The time-domain received signal generated by the subtraction unit 13 by removing or suppressing the advancing-wave component is outputted as an advancing-wave removed time-domain signal.

As shown in FIG. 1, the variable coefficient IIR filter 14 includes a subtraction unit 21 and a variable coefficient FIR filter 22. The advancing-wave removed time-domain signal outputted from the subtraction unit 13 is supplied to the subtraction unit 21.

The subtraction unit 21 subtracts a replica of a multipath component (hereinafter, referred to as a delay wave) arriving later than a dominant wave from the advancing-wave removed time-domain signal which has been supplied from the variable coefficient FIR filter 22, thereby removing a delay-wave component included in the advancing-wave removed time-domain signal. A delay wave removed time-domain signal generated by the subtraction unit 21 by removing the delay-wave component is supplied to the variable coefficient FIR filter 22 as well as supplied to a subsequent stage of the equalizer 1.

The variable coefficient FIR filter 22 performs filtering to the signal supplied from the subtraction unit 21 by using a coefficient generated by a not-shown coefficient update circuit to thereby generate a delay-wave replica. The delay-wave replica generated by the variable coefficient FIR filter 22 is supplied to the subtraction unit 21.

As described above, in the equalizer 1, the replicas of the multipath components are generated by controlling coefficients of the variable coefficient FIR filters 11, 22 and the multipath components included in a received signal are removed by using replicas of multipath components.

An example of the related art includes JP-A-2005-150839 (Patent Document 1).

SUMMARY OF THE INVENTION

According to the above equalization method, it is difficult to completely remove multipath components if the coefficients of the variable coefficient FIR filters are not proper, in addition, a multipath component having a delay time which is integral multiple of the delay time of actually existing multipath will be added.

When detection of a path position fails, a replica of multipath which does not originally exist is generated, as a result, new multipath may be added by performing subtraction processing by using the multipath.

The above phenomenon becomes prominent when the coefficient update does not follow the change due to Doppler and the like or when multipath having long delay time exists in the received signal.

Thus, it is desirable to remove the interference due to multipath by using a replica of a multiple component more certainly.

An equalizer or an equalizer included in a receiving device according to an embodiment of the invention includes a replica generation means for generating a replica of a multipath component by applying an adaptive filter to a received signal which has received multipath interference, a removal means for generating a multipath-component removed signal which is the received signal from which the multipath component has been removed by subtracting the replica generated by the replica generation means from the received signal, a correlation value calculation means for calculating a correlation value between the received signal and the replica, a power value calculation means for calculating a power value of the replica, a determination means for determining whether the replica generated by the replica generation means is the replica of the multipath component included in the received signal or not based on the correlation value calculated by the correlation value calculation means and the power value calculated by the power value calculation means, and a selection means for outputting the multipath-component removed signal generated by the removal means when it is determined that the replica generated by the replica generation means is the replica of the multipath component included in the received signal by the determination means, and outputting the received signal when it is determined that the replica generated by the replica generation means is not the replica of the multipath component included in the received signal by the determination means.

It is possible to allow the correlation value calculation means to calculate accumulation of correlation values between the received signal and the replica at respective time points for given time points, to allow the power value calculation means to calculate accumulation of power values of the replica at respective time points for the given time points, and to allow the determination means to determine that the replica generated by the replica generation means is the replica of the multipath component included in the received signal when the ratio between the accumulated result of power values of replica calculated by the power value calculation means and the accumulated result of correlation values of the replica calculated by the correlation value calculation means exceeds a reference value.

An equalization method or a program according to an embodiment of the invention includes the steps of generating a replica of a multipath component by applying an adaptive filter to a received signal which has received multipath interference, generating a multipath-component removed signal which is the received signal from which the multipath component has been removed by subtracting the generated replica generated from the received signal, calculating a correlation value between the received signal and the replica, calculating a power value of the replica, determining whether the generated replica is the replica of the multipath component included in the received signal or not based on the calculated correlation value and the power value, and outputting the multipath-component removed signal when it is determined that the replica is the replica of the multipath component included in the received signal, and outputting the received signal when it is determined that the replica is not the replica of the multipath component included in the received signal.

An equalizer or an equalizer included in a receiving device according to an embodiment of the invention includes a replica generation means for generating a replica of a multipath component by applying an adaptive filter to an OFDM received signal which has received multipath interference, a replacement means for generating a multipath-component removed signal which is the OFDM received signal from which the multipath component has been removed by replacing a signal in a section receiving multipath interference in a FFT section set with respect to each symbol of the OFDM received signal with a signal in a section of the replica generated by the replica generation means, which corresponding to the above section, a correlation value calculation means for calculating a correlation value between the OFDM received signal and the replica, a power value calculation means for calculating a power value of the replica, a determination means for determining whether the replica generated by the replica generation means is the replica of the multipath component included in the OFDM received signal or not based on the correlation value calculated by the correlation value calculation means and the power value calculated by the power value calculation means, and a selection means for outputting the multipath-component removed signal generated by the replacement means when it is determined that the replica generated by the replica generation means is the replica of the multipath component included in the OFDM received signal by the determination means, and outputting the OFDM received signal when it is determined that the replica generated by the replica generation means is not the replica of the multipath component included in the OFDM received signal by the determination means.

It is possible to allow the correlation value calculation means to calculate accumulation of correlation values between the OFDM received signal and the replica at respective time points for given time points, to allow the power value calculation means to calculate accumulation of power values of the replica at respective time points for the given time points, and to allow the determination means to determine that the replica generated by the replica generation means is the replica of the multipath component included in the received signal when the ratio between the accumulated result of power values of replica calculated by the power value calculation means and the accumulated result of correlation values of the replica calculated by the correlation value calculation means exceeds a reference value.

An equalization method or a program according to an embodiment of the invention includes the steps of generating a replica of a multipath component by applying an adaptive filter to an OFDM received signal which has received multipath interference, generating a multipath-component removed signal which is the OFDM received signal from which the multipath component has been removed by replacing a signal in a section receiving multipath interference in a FFT section set with respect to each symbol of the OFDM received signal with a signal in a section of the replica, which corresponding to the above section, calculating a correlation value between the OFDM received signal and the replica, calculating a power value of the replica, determining whether the generated replica is the replica of the multipath component included in the OFDM received signal or not based on the calculated correlation value and the power value and outputting the multipath-component removed signal when it is determined that the replica is the replica of the multipath component included in the OFDM received signal, and outputting the OFDM received signal when it is determined that the replica is not the replica of the multipath component included in the OFDM received signal.

According to one embodiment of the invention, a replica of a multipath component is generated by applying an adaptive filter to a received signal which has received multipath interference, and a multipath-component removed signal which is the received signal from which the multipath component has been removed by subtracting the generated replica from the received signal. Additionally, a correlation value between the received signal and the replica is calculated and a power value of the replica is calculated, then, whether the generated replica is the replica of the multipath component included in the received signal or not based on the calculated correlation value and the power value. When it is determined that the replica is the replica of the multipath component included in the received signal, the multipath-component removed signal is outputted, and when it is determined that the replica is not the replica of the multipath component included in the received signal, the received signal is outputted.

According to one embodiment of the invention, a replica of a multipath component is generated by applying an adaptive filter to an OFDM received signal which has received multipath interference and a multipath-component removed signal which is the OFDM received signal from which the multipath component has been removed by replacing a signal in a section receiving multipath interference in a FFT section set with respect to each symbol of the OFDM received signal with a signal in a section of the replica, which corresponding to the above section. A correlation value between the OFDM received signal and the replica is calculated, and a power value of the replica is calculated, then, whether the generated replica is the replica of the multipath component included in the OFDM received signal or not based on the calculated correlation value and the power value. When it is determined that the replica is the replica of the multipath component included in the received signal, the multipath-component removed signal is outputted, and when it is determined that the replica is not the replica of the multipath component included in the OFDM received signal, the OFDM received signal is outputted.

According to the embodiments of the invention, it is possible to remove interference due to multipath by using a replica of a multipath component more certainly.

BRIEF DESCRIPTION OF THE DRAWINGS

FIG. 18 is a block diagram showing a configuration example of hardware of a computer.

DESCRIPTION OF THE PREFERRED EMBODIMENTS

Hereinafter, preferred embodiments will be explained. The explanation will be performed in the following order.
1. First Embodiment (an example of performing processing with respect to the whole received signal)
2. Second Embodiment (an example of performing processing with respect to a section receiving multipath interference in the whole OFDM received signal)

First Embodiment

Configuration of Equalizer

Figure 2:
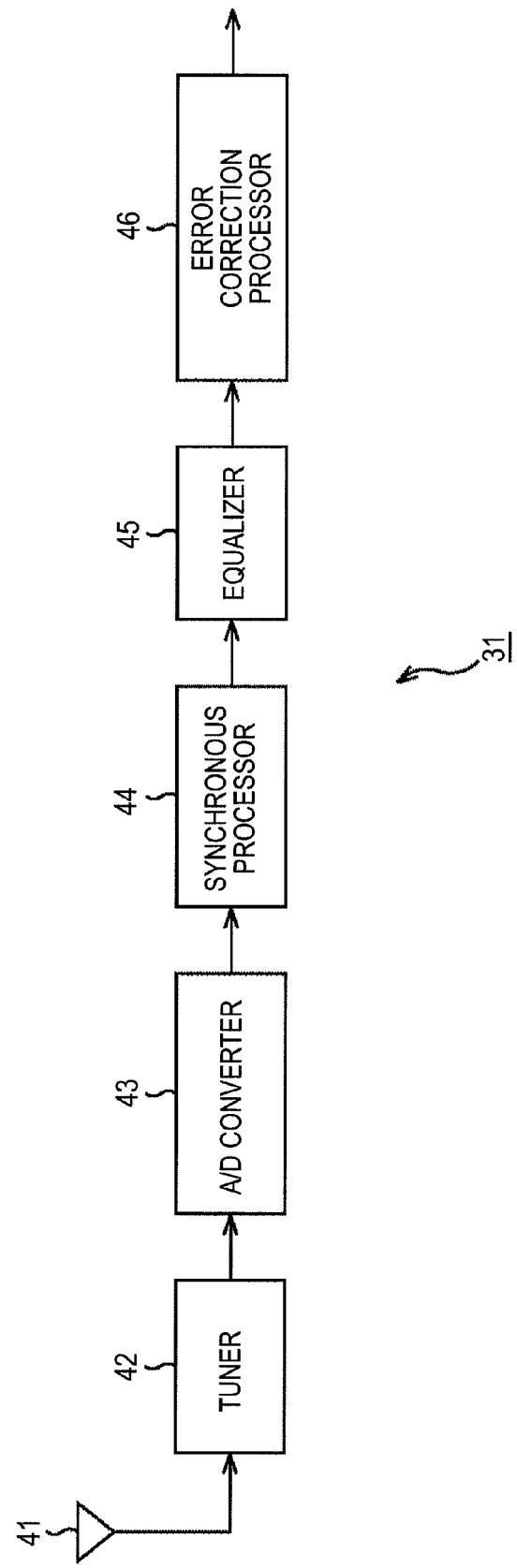
FIG. 2 is a diagram showing part of a configuration example of a receiving device according to an embodiment of the invention.

FIG. 2 is a diagram showing part of a configuration example of a receiving device according to an embodiment of the invention.

A receiving device 31 includes a tuner 42, an A/D converter 43, a synchronous processor 44, an equalizer 45 and an error correction processor 46. At least the equalizer 45 among them is provided in the receiving device 31 in a form of an LSI (Large Scale Integrated Circuit).

The tuner 42 performs frequency conversion of an RF signal received by a receiving antenna 41 into an IF signal, outputting the IF signal to the A/D converter 43.

The A/D converter 43 performs A/D conversion with respect to the IF signal supplied from the tuner 42, outputting the digitalized IF signal to the synchronous processor 44.

The synchronous processor 44 performs synchronous processing with respect to the IF signal supplied from the A/D converter 43, outputting the signal obtained by performing synchronous processing to the equalizer 45.

The equalizer 45 removes skew components of a transmission channel included in the signal supplied from the synchronous processor 44, outputting the obtained equalized signal to the error correction processor 46.

The error correction processor 46 performs correction processing with respect to the equalized signal supplied from the equalizer 45, outputting data obtained by performing error correction processing as decoded data to a subsequent stage circuit.

Figure 1:
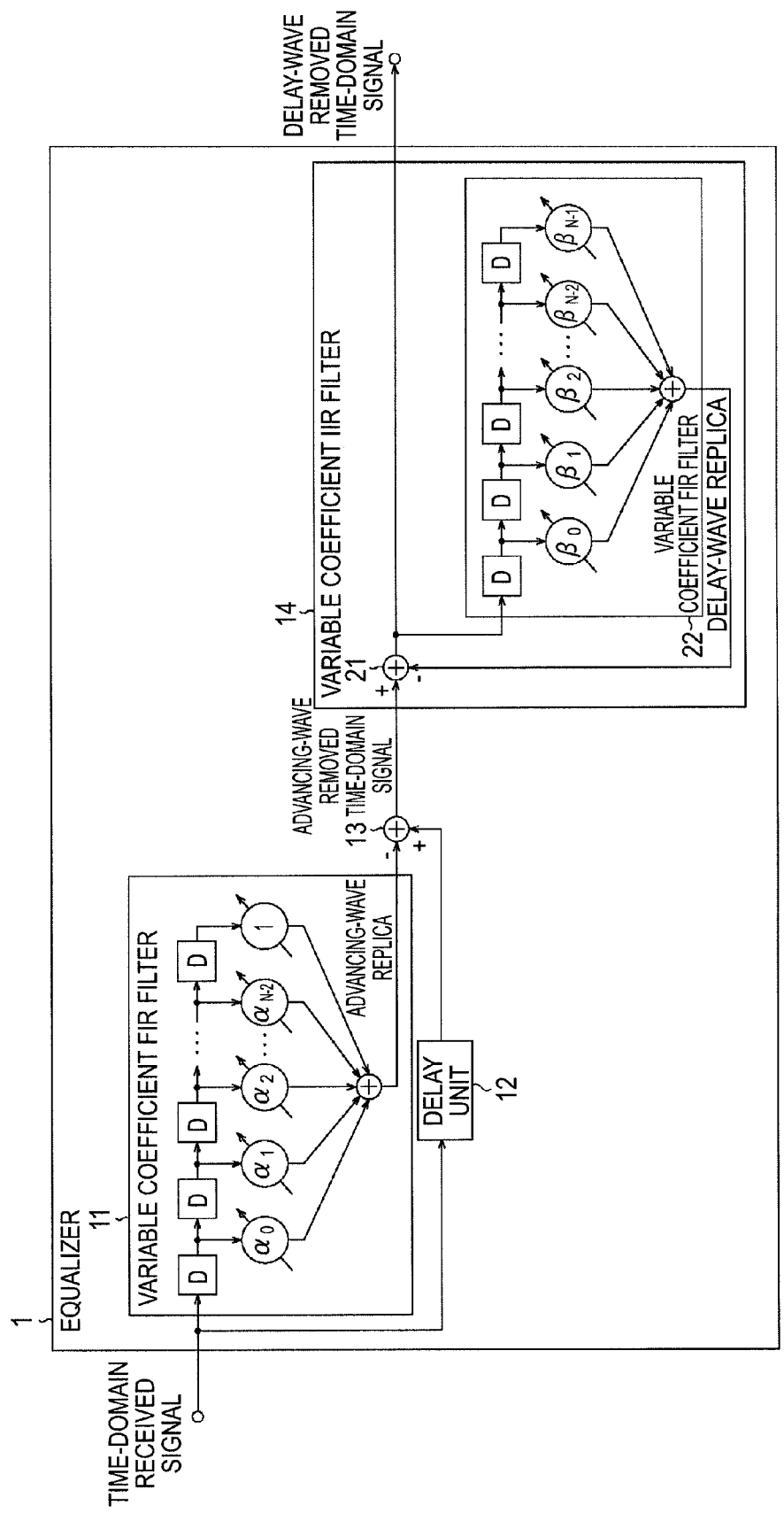
FIG. 1 is a diagram showing a configuration of an equalizer of related art.
Figure 3:
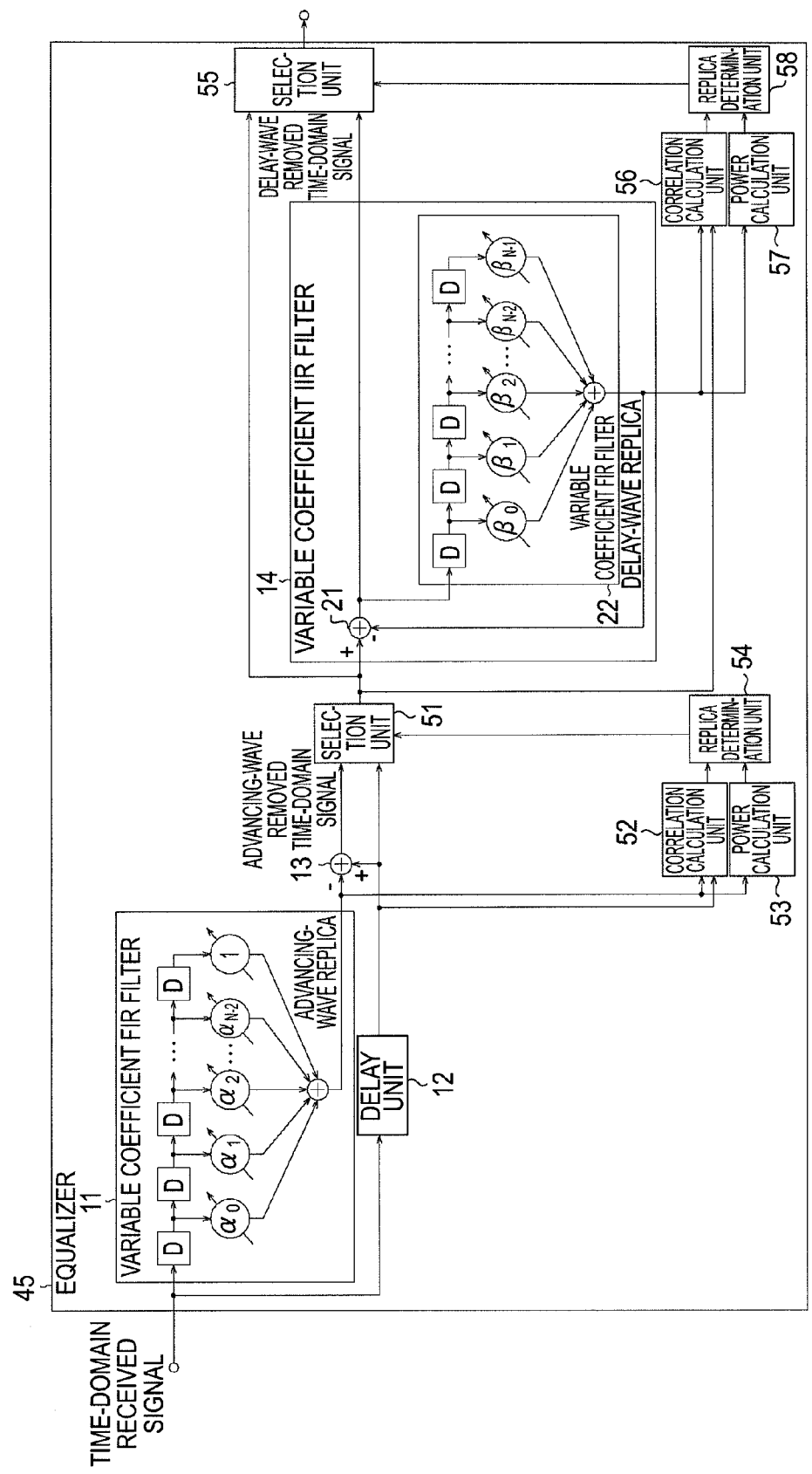
FIG. 3 is a diagram showing a configuration example of an equalizer of FIG. 2.

FIG. 3 is a diagram showing a configuration example of the equalizer 45 of FIG. 2. The same numerals are given to the same components as components of FIG. 1.

The equalizer 45 is provided with a selection unit 51, a correlation calculation unit 52, a power calculation unit 53 and a replica determination unit 54, in addition to the variable coefficient FIR filter 11, the delay unit 12 and the subtraction unit 13 as a configuration of generating and outputting an advancing-wave removed time-domain signal. Also, a selection unit 55, a correlation calculation unit 56, a power calculation unit 57 and a replica determination unit 58 are provided, in addition to the variable coefficient IIR filter 14 as a configuration of generating and outputting a delay-wave removed time-domain signal. The time-domain received signal outputted from the synchronous processor 44 shown in FIG. 2 is inputted to the variable coefficient FIR filter 11 and the delay unit 12.

The variable coefficient FIR filter 11 performs filtering using a coefficient generated by a not-shown coefficient update circuit, thereby generating an advancing-wave replica. The variable coefficient FIR filter 11 includes functions as a replica generating means. The advancing-wave replica generated by the variable coefficient FIR filter 11 is supplied to the subtraction unit 13, the correlation calculation unit 52 and the power calculation unit 53.

The delay unit 12 delays the inputted time-domain received signal so that output timing of the advancing-wave replica from the variable coefficient FIR filter 11 corresponds to output timing of the time-domain received signal, and outputs the signal. The time-domain received signal outputted from the delay unit 12 is supplied to the subtraction unit 13, the selection unit 51 and the correlation calculation unit 52.

The subtraction unit 13 removes or suppresses an advancing-wave component by subtracting the advancing-wave replica generated by the variable coefficient FIR filter 11 from the time-domain received signal supplied from the delay unit 12. The subtraction unit 13 includes functions as a removal means of the advancing-wave component. An advancing-wave removed time-domain signal generated by the subtraction unit 13 by removing or suppressing the advancing-wave component is supplied to the selection unit 51.

The selection unit 51 selects either the time-domain received signal supplied from the delay unit 12 or the advancing-wave removed time-domain signal supplied from the subtraction unit 13 in accordance with the determination result by the replica determination unit 54, outputting the selected signal.

As described later, a signal representing a determination result of whether the advancing-wave replica generated by the variable coefficient FIR filter 11 is correct or not is supplied from the replica determination unit 54. The correct replica of a multipath component means a signal which is the same as or similar to the multipath component actually included in the time-domain received signal.

When it is determined that the advancing-wave replica is correct by the replica determination unit 54, the advancing-wave removed time-domain signal supplied from the subtraction unit 13 is selected in the selection unit 51. On the other hand, when it is determined that the advancing-wave replica is not correct by the replica determination unit 54, the time-domain received signal supplied from the delay unit 12 is selected.

When the signal component is subtracted from the time-domain received signal by using an incorrect advancing-wave replica, a multipath component may be newly added, which deteriorates receiving performance. Therefore, when the advancing-wave replica generated by the variable coefficient FIR filter 11 is not correct, the time-domain received signal just as it has been inputted is selected and outputted to a subsequent stage, thereby preventing the occurrence of the above adverse effect.

The correlation calculation unit 52 calculates correlation between the time-domain received signal supplied from the delay unit 12 and the advancing-wave replica generated by the variable coefficient FIR filter 11 in each time point. When the advancing-wave replica generated by the variable coefficient FIR filter 11 is correct, the advancing-wave replica will be a signal having high correlation with the time-domain received signal. The correlation calculation unit 52 outputs a signal representing the calculation result to the replica determination unit 54.

The power calculation unit 53 calculates power of the advancing-wave replica generated by the variable coefficient FIR filter 11, outputting a signal representing the calculation result to the replica determination unit 54.

The replica determination unit 54 determines whether the advancing-wave replica generated by the variable coefficient FIR filter 11 is correct or not based on a correlation value calculated by the correlation calculation unit 52 and a power value of the advancing-wave replica calculated by the power calculation unit 53.

Here, a method of determining correctness of the advancing-wave replica will be explained.

Assume that the time-domain received signal outputted from the delay unit 12 at a time point "k" is "a(k)", and the advancing-wave replica generated and outputted by the variable coefficient FIR filter 11 at the time point "k" is "b(k)". When the advancing wave is "$a^{(0)}(k)$", the dominant wave is "$a^{(1)}(k)$", and the delay wave is "$a^{(2)}(k)$", the time-domain received signal "a(k)" can be represented as the following formula (1). Superior figures shown in parentheses indicate the order of signals on the time axis.

$$a(k) = a^{(0)}(k) + a^{(1)}(k) + a^{(2)}(k) \quad (1)$$

Since "a(k)", "$a^{(m)}(k)$ (m=0, 1, 2)" and "b(k)" are complex signals, the "a(k)" can be represented by the following formula (2). Also, "$a^{(m)}(k)$" can be represented by the following formula (3) and "b(k)" can be represented by the following formula (4).

$$a(k) = a_r(k) + ja_i(k) \quad (2)$$

$$a^{(m)}(k) = a_r^{(m)}(k) + ja_i^{(m)}(k) \quad (3)$$

$$b(k) = b_r(k) + jb_i(k) \quad (4)$$

In the above, $a_r(k)$, $a_i(k)$, $a_r^{(m)}(k)$, $a_i^{(m)}(k)$ (m=0, 1, 2), $b_r(k)$ and $b_i(k)$ are real numbers and "j" represents an imaginary unit.

The correlation value between the time-domain received signal "a(k)" and the advancing-wave replica "b(k)" is calculated at each time point, and correlation values for given N-time points are accumulated. The time point when the accumulation is started is "0".

When the accumulated result of correlation values for the N-time points is "$C = C_r + jC_i$" and a conjugation of "b(k)" is "b(k)" with "−" thereon, the accumulated result "$C = C_r + jC_i$" can be represented by the following formula (5).

$$\begin{aligned} C &= C_r + jC_i \\ &= \sum_{k=0}^{N-1} a(k)\overline{b}(k) \\ &= \sum_{k=0}^{N-1} (a_r(k) + ja_i(k))(b_r(k) - jb_i(k)) \\ &= \sum_{k=0}^{N-1} \{(a_r^{(0)}(k) + a_r^{(1)}(k) + a_r^{(2)}(k)) + \\ &\quad j(a_i^{(0)}(k) + a_i^{(1)}(k) + a_i^{(2)}(k))\}(b_r(k) - jb_i(k)) \\ &= \sum_{k=0}^{N-1} [\{a_r^{(0)}(k) + a_r^{(1)}(k) + a_r^{(2)}(k)\}b_r(k) + \\ &\quad \{a_i^{(0)}(k) + a_i^{(1)}(k) + a_i^{(2)}(k)\}b_i(k)] + \\ &\quad j\sum_{k=0}^{N-1} [\{a_i^{(0)}(k) + a_i^{(1)}(k) + a_i^{(2)}(k)\}b_r(k) - \\ &\quad \{a_r^{(0)}(k) + a_r^{(1)}(k) + a_r^{(2)}(k)\}b_i(k)] \end{aligned} \quad (5)$$

Particularly, a real part "Cr" can be represented by the following formula (6).

$$\begin{aligned} C_r &= \sum_{k=0}^{N-1} [\{a_r^{(0)}(k) + a_r^{(1)}(k) + a_r^{(2)}(k)\}b_r(k) + \\ &\quad \{a_i^{(0)}(k) + a_i^{(1)}(k) + a_i^{(2)}(k)\}b_i(k)] \\ &= \sum_{k=0}^{N-1} \{a_r^{(0)}(k)b_r(k) + a_i^{(0)}(k)b_i(k)\} + \\ &\quad \sum_{k=0}^{N-1} \{a_r^{(1)}(k)b_r(k) + a_i^{(1)}(k)b_i(k)\} + \\ &\quad \sum_{k=0}^{N-1} \{a_r^{(2)}(k)b_r(k) + a_i^{(2)}(k)b_i(k)\} \end{aligned} \quad (6)$$

When the coefficient is correct and an ideal advancing-wave replica is generated by the variable coefficient FIR filter 11, the correlation value between the dominant wave or the delay wave of the time-domain received signal and the advancing-wave replica becomes small, on the other hand, the correlation value between the advancing wave and the advancing-wave replica becomes large.

In the formula (6), the correlation value between the dominant wave or the delay wave and the advancing-wave replica is represented by values of the second term and the third term, and the correlation value between the advancing wave and the advancing-wave replica is represented by a value of the first term.

When the ideal advancing-wave replica is generated, $a_r^{(0)}(k) \approx b_r(k)$ as well as $a_i^{(0)}(k) \approx b_i(k)$ hold, therefore, "$C_r$" of the formula (6) can be represented as the following formula (7). In the formula, "$\alpha$" is a sum of a value of the second term and a value of the third term of the formula (6).

$$C_r = \sum_{k=0}^{N-1} \{a_r^{(0)}(k) b_r(k) + a_i^{(0)}(k) b_i(k)\} + \alpha \quad (7)$$
$$\approx \sum_{k=0}^{N-1} (b_r(k)^2 + b_i(k)^2) + \alpha$$

Assume that the accumulated result of power in respective time points of the advancing-wave replica for N-time points is "P", a value of the first term of the right side of a formula of the second line in the formula (7) corresponds to "P".

On the other hand, when the advancing-wave replica is not generated correctly, it is difficult to transform the formula from the first-line formula to the second-line formula in the formula (7), and the correlation value between the advancing wave and the advancing-wave replica which is represented as a value of the first term of the first-line formula also becomes small.

In determination whether the advancing-wave replica generated by the variable coefficient FIR filter 11 is correct or not, namely, whether the advancing-wave replica represents the same component as the component of the advancing wave included the time-domain received signal, the following principle is used.

When a value obtained by normalizing "$C_r$" calculated in the formula (6) by the accumulated result P of power values of the advancing-wave replica for N-time points (a ratio of "$C_r$" with respect to the accumulated result P) is larger than a given reference value, the advancing-wave replica is determined as a correct replica. Conversely, when the value is smaller than the given reference value, the advancing-wave replica is determined as an incorrect replica.

In order to use the above principle, the correlation calculation unit 52 is configured to perform calculation of the first term of the above formula (6). The power calculation unit 53 is configured to perform calculation of the first term of the second-line formula of the above formula (7). The configurations of the correlation calculation unit 52 and the power calculation unit 53 will be described later.

Returning to the explanation of FIG. 3, the signal selected by the selection unit 51 in accordance with the determination result using the above principle is supplied to the variable coefficient IIR filter 14, the selection unit 55 and correlation calculation unit 56. When it is not necessary to distinguish between the time-domain received signal supplied from the delay unit 12 and the advancing-wave removed time-domain signal supplied from the subtraction unit 13, the signal selected by the selection unit 51 is referred to as a merely a time-domain received signal.

The variable coefficient IIR filter 14 includes the subtraction unit 21 and the variable coefficient FIR filter 22. The time-domain received signal outputted from the selection unit 51 is inputted to the subtraction unit 21.

The subtraction unit 21 removes a delay-wave component included in the time-domain received signal by subtracting a delay-wave replica supplied from the variable coefficient FIR filter 22 from the time-domain received signal supplied from the selection unit 51. The delay-wave removed time-domain signal generated by the subtraction unit 21 by subtracting the delay-wave replica is supplied to the variable coefficient FIR filter 22 as well as supplied to the selection unit 55.

The variable coefficient FIR filter 22 performs filtering with respect to the delay-wave removed time-domain signal supplied from the subtraction unit 21 by using a coefficient generated by a not-shown coefficient update circuit to thereby generate the delay-wave replica. The delay-wave replica generated by the variable coefficient FIR filter 22 is supplied to the subtraction unit 21, the correlation calculation unit 56 and the power calculation unit 57.

The selection unit 55 selects either the time-domain received signal supplied from the selection unit 51 or the delay-time removed time-domain signal supplied from the subtraction unit 21 in accordance with the determination result by the replica determination unit 58, outputting the signal. A signal representing whether the delay-wave replica generated by the variable coefficient FIR filter 22 is correct or not is supplied from the replica determination unit 58.

When it is determined that the delay-wave replica is correct by the replica determination unit 58, the delay-wave removed time-domain signal supplied from the subtraction unit 21 is selected in the selection unit 55. On the other hand, when it is determined that the delay-wave replica is not correct by the replica determination unit 58, the time-domain received signal supplied from the selection unit 51 is selected.

As described above, the same processing as the processing performed at the time of removing the advancing-wave component is performed also at the time of removing the delay-wave component.

In the case that the signal component is subtracted by using an incorrect delay-wave replica, a multipath component is newly added, which deteriorates receiving performance. Therefore, when the delay-wave replica generated by the variable coefficient FIR filter 22 is not correct, the time-domain received signal just as it has been inputted is selected and outputted to a sequential stage, thereby preventing the occurrence of the above adverse effect.

The correlation calculation unit 56 calculates correlation between the time-domain received signal supplied from the selection unit 51 and the delay-wave replica generated by the variable coefficient FIR filter 22 at each time point. When the delay-wave replica generated by the variable coefficient FIR filter 22 is correct, the delay-wave replica will be a signal having high correlation with the time-domain received signal supplied from the selection unit 51. The correlation calculation unit 56 outputs a signal representing the calculation result to the replica determination unit 58.

The power calculation unit 57 calculates power of the delay-wave replica generated by the variable coefficient FIR filter 22, outputting a signal representing the calculation result to the replica determination unit 58.

The replica determination unit 58 determines whether the delay-wave replica generated by the variable coefficient FIR filter 22 is correct or not based on a correlation value calculated by the correlation calculation unit 56 and a power value of the delay-wave replica calculated by the power calculation unit 57.

The method of determining correctness of the delay-wave replica is the same as the method of determining correctness of the advancing-wave replica. "b(k)" of the formula (6) represents the advancing-wave replica in the determination of correctness of the advancing-wave replica, however, "b(k)" represents the delay-wave replica generated by the variable coefficient FIR filter 22 in the determination of correctness of the delay-wave replica.

The formula (6) can be transformed into the following formula (8).

$$C_r = \sum_{k=0}^{N-1} [\{a_r^{(0)}(k) + a_r^{(1)}(k) + a_r^{(2)}(k)\}b_r(k) + \qquad (8)$$
$$\{a_i^{(0)}(k) + a_i^{(1)}(k) + a_i^{(2)}(k)\}b_i(k)]$$
$$= \sum_{k=0}^{N-1} \{a_r^{(2)}(k)b_r(k) + a_i^{(2)}(k)b_i(k)\} +$$
$$\sum_{k=0}^{N-1} \{a_r^{(0)}(k)b_r(k) + a_i^{(0)}(k)b_i(k)\} +$$
$$\sum_{k=0}^{N-1} \{a_r^{(1)}(k)b_r(k) + a_i^{(1)}(k)b_i(k)\}$$

When the coefficient is correct and an ideal delay-wave replica is generated by the variable coefficient FIR filter 22, the correlation value between the advancing wave or the dominant wave of the time-domain received signal outputted from the selection unit 51 and the delay-wave replica becomes small, on the other hand, the correlation value between the delay wave and the delay-wave replica becomes large.

In Formula (8), the correlation value between the advancing wave or the dominant wave and the delay-wave replica is represented by values of the second term and the third term, and the correlation value between the delay wave and the delay-wave replica is represented by a value of the first term.

When the ideal delay-wave replica is generated, $a_r^{(2)}(k) \approx b_r(k)$ as well as $a_i^{(2)}(k) \approx b_i(k)$ hold, therefore, "Cr" of the formula (8) can be represented as the following formula (9). In the formula, "β" is a sum of a value of the second term and a value of the third value of the formula (8).

$$C_r = \sum_{k=0}^{N-1} \{a_r^{(2)}(k)b_r(k) + a_i^{(2)}(k)b_i(k)\} + \beta \qquad (9)$$
$$\approx \sum_{k=0}^{N-1} (b_r(k)^2 + b_i(k)^2) + \beta$$

Assume that the accumulated result of power in respective time points of the delay-wave replica for N-time points is "P", a value of the first term of the right side of a formula of the second line in the formula (9) corresponds to "P".

On the other hand, when the delay-wave replica is not generated correctly, it is difficult to transform the formula from the first-line formula to the second-line formula in the formula (9), and the correlation value between the delay wave and the delay-wave replica which is represented as a value of the first term of the first-line formula also becomes small.

In determination whether the delay-wave replica generated by the variable coefficient FIR filter 22 is correct or not, namely, whether the delay-wave replica represents the same component as the component of the delay wave included the time-domain received signal, the following principle is used.

When a value obtained by normalizing "$C_r$" calculated in the formula (9) by the accumulated result P of power values of the advancing-wave replica for N-time points is larger than a given reference value, the delay-wave replica is determined as a correct replica. Conversely, when the value of smaller than the given reference value, the delay-wave replica is determined as an incorrect replica.

In order to use the above principle, the correlation calculation unit 56 is configured to perform calculation of the first term of the above formula (8). The power calculation unit 57 is configured to perform calculation of the first term of the second-line formula of the above formula (9).

The signal selected by the selection unit 55 in accordance with the determination result using the above principle is supplied to the error correction processor 46 of FIG. 2 as an equalized signal. To the error correction processor 46, any of a signal from which the advancing-wave component and the delay-wave component are removed, a signal from which only the advancing-wave component is removed or only the delay-wave component is removed and a time-domain received signal just as it has been received, from which neither the advancing-wave signal nor the delay-wave signal is removed will be supplied.

Figure 4:
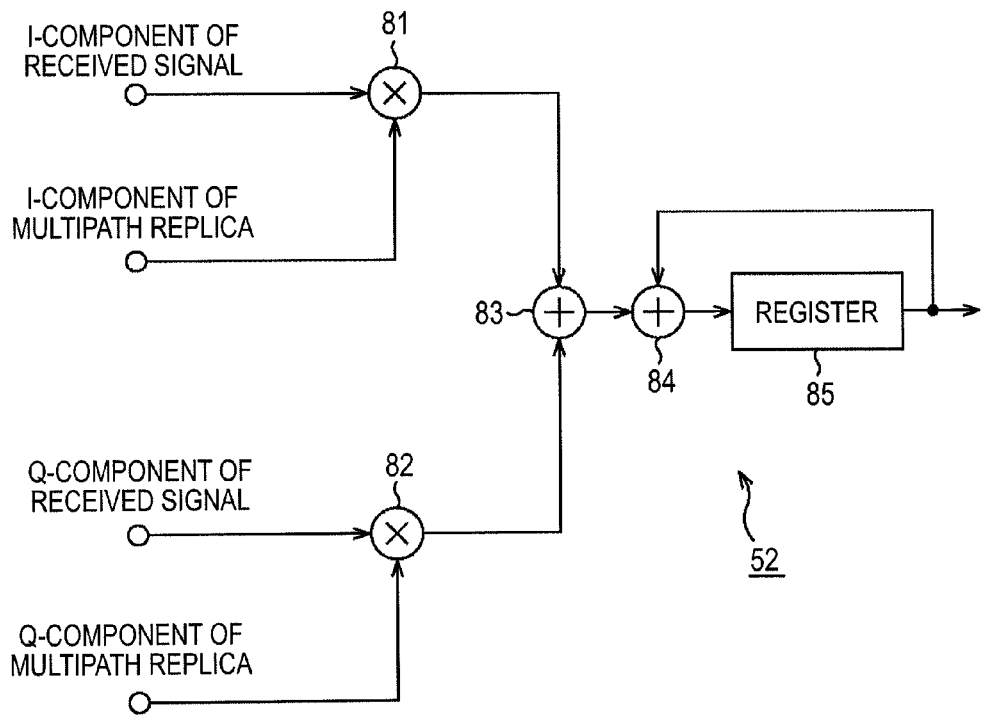
FIG. 4 is a diagram showing a configuration example of a correlation calculation unit of FIG. 3.

FIG. 4 is a diagram showing a configuration example of the correlation calculation unit 52 of FIG. 3.

As described above, the correlation calculation unit 52 is configured to perform calculation of the first term of the formula (6). An "I" component of the time-domain received signal outputted from the delay unit 12 and an "I" component of the advancing-wave replica outputted from the variable coefficient FIR filter 11 are outputted to a multiplying unit 81. A "Q" component of the time-domain received signal outputted from the delay unit 12 and a "Q" component of the advancing-wave replica outputted from the variable coefficient FIR filter 11 are inputted into a multiplying unit 82.

The multiplying unit 81 multiplies the "I" component of the time-domain received signal by the "I" component of the advancing-wave replica, outputting a signal representing the multiplication result to an adding unit 83.

The multiplying unit 82 multiplies the "Q" component of the time-domain received signal by the "Q" component of the advancing-wave replica, outputting a signal representing the multiplication result to the adding unit 83.

The adding unit 83 adds the multiplication result by the multiplying unit 81 to the multiplication result by the multiplying unit 82, outputting a signal representing the addition result to an adding unit 84. An output of the adding unit 83 corresponds to a correlation value of the time-domain received signal and the advancing-wave replica in each time point.

The adding unit 84 adds the output from the adding unit 83 to an output from the register 85 and stores the addition result in the register 85.

The register 85 outputs an accumulated result to the replica determination unit 54 when the accumulation of correlation values for a given N-time points is completed. At the time of starting accumulation, the value stored in register 85 is cleared.

The correlation calculation unit 56 has the same configuration as the configuration of the correlation calculation unit 52 shown in FIG. 4. An "I" component of the time-domain received signal outputted from the selection unit 51 and an "I" component of the delay-wave replica are multiplied at the multiplying unit 81 and a "Q" component of the time-domain received signal and a "Q" component of the delay-wave replica are multiplied at the multiplying unit 82. The respective multiplication results are added at the adding unit 83 and the addition result is added to the value stored in the register 85 by the adding unit 84 to calculate the accumulated result.

Figure 5:
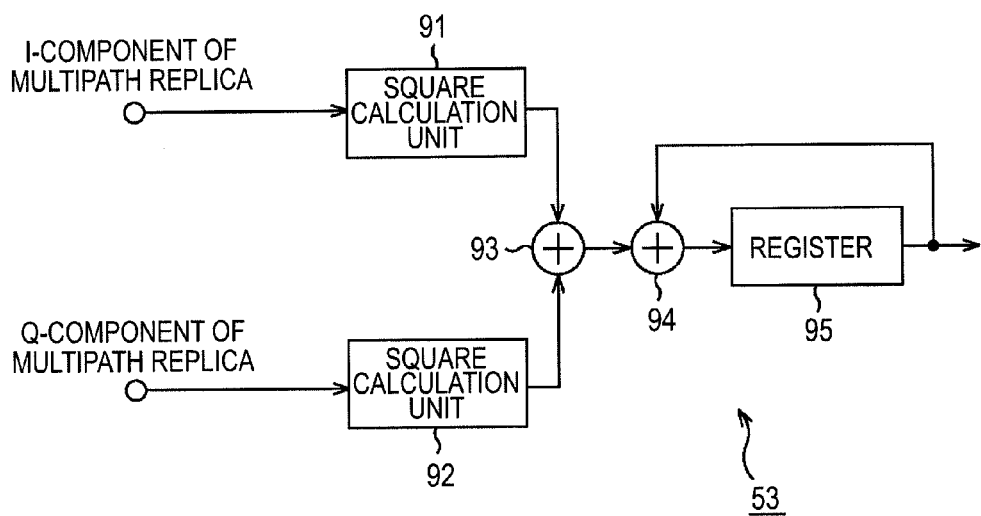
FIG. 5 is a diagram showing a configuration example of a power calculation unit of FIG. 3.

FIG. 5 is a diagram showing a configuration example of a power calculation unit 53 of FIG. 3.

As described above, the power calculation unit 53 is configured to perform calculation of the first term of the second-line formula in the formula (7). An "I" component of the advancing-wave replica outputted from the variable coefficient FIR filter 11 is inputted to a square calculation unit 91 and a "Q" component is inputted to a square calculation unit 92.

The square calculation unit 91 squares the "I" component of the advancing-wave replica and outputs the calculation result to an adding unit 93.

The square calculation unit 92 squares the "Q" component of the advancing-wave replica and outputs the calculation result to the adding unit 93.

The adding unit 93 adds the calculation result by the square calculation unit 91 to the calculation result by the square calculation unit 92, outputting a signal representing the addition result to an adding unit 94. An output of the adding unit 93 corresponds to a power value of the advancing-wave replica in each time point.

The adding unit 94 adds the output of the adding unit 93 to an output from a register 95 and stores the addition result in the register 95.

The register 95 outputs an accumulated result to the replica determination unit 54 when the accumulation of correlation values for a given N-time points is completed. At the time of starting accumulation, the value stored in register 95 is cleared.

The power calculation unit 57 has the same configuration as the configuration of the power configuration unit 53 shown in FIG. 5. A square of the "I" component of the delay-wave replica is calculated in the square calculation unit 91, and a square of the "Q" component of the delay-wave replica is calculated in the square calculation unit 92. The respective calculation results are added at the adding unit 93 and the addition result is added to the value stored in the register 95 by the adding unit 94 to calculate the accumulated result.

[Operations of Equalizer]

Next, operations of the equalizer 45 having the above configuration will be explained with reference to flowcharts. Processing in each step is performed in parallel to, or before and after the other processing.

First, equalization processing by the equalizer 45 will be explained with reference to a flowchart of FIG. 6.

In Step S1, advancing-wave removal processing is performed, and in Step S2, delay-wave removal processing is performed.

Next, the advancing-wave removal processing performed in Step S1 of FIG. 6 will be explained with reference to a flowchart of FIG. 7.

In Step S11, the delay unit 12 delays a time-domain received signal and outputs the delayed time-domain received signal.

In Step S12, the variable coefficient FIR filter 11 performs filtering by using a coefficient generated by a coefficient update circuit to thereby generate an advancing-wave replica.

In Step S13, the subtraction unit 13 subtracts the advancing-wave replica generated by the variable coefficient FIR filter 11 from the time-domain received signal delayed by the delay unit 12 to thereby generate an advanced-wave removed time-domain signal.

In Step S14, the correlation calculation unit 52 calculates correlation between the time-domain received signal and the advancing-wave replica generated by the variable coefficient FIR filter 11.

In Step S15, the power calculation unit 53 calculates power of the advancing-wave replica generated by the variable coefficient FIR filter 11.

In Step S16, the replica determination unit 54 determines whether the advancing-wave replica is correct or not based on the correlation value calculated by the correlation calculation unit 52 and the power value of the advancing-wave replica calculated by the power calculation unit 53 as described above.

In Step S17, the selection unit 51 selects either the time-domain received signal delayed by the delay unit 12 or the advancing-wave removed time-domain signal generated by the subtraction unit 13 in accordance with the determination result by the replica determination unit 54, outputting the signal. After that, the process returns to Step S1 of FIG. 6, and the processing of Step S2 is performed.

Figure 8:
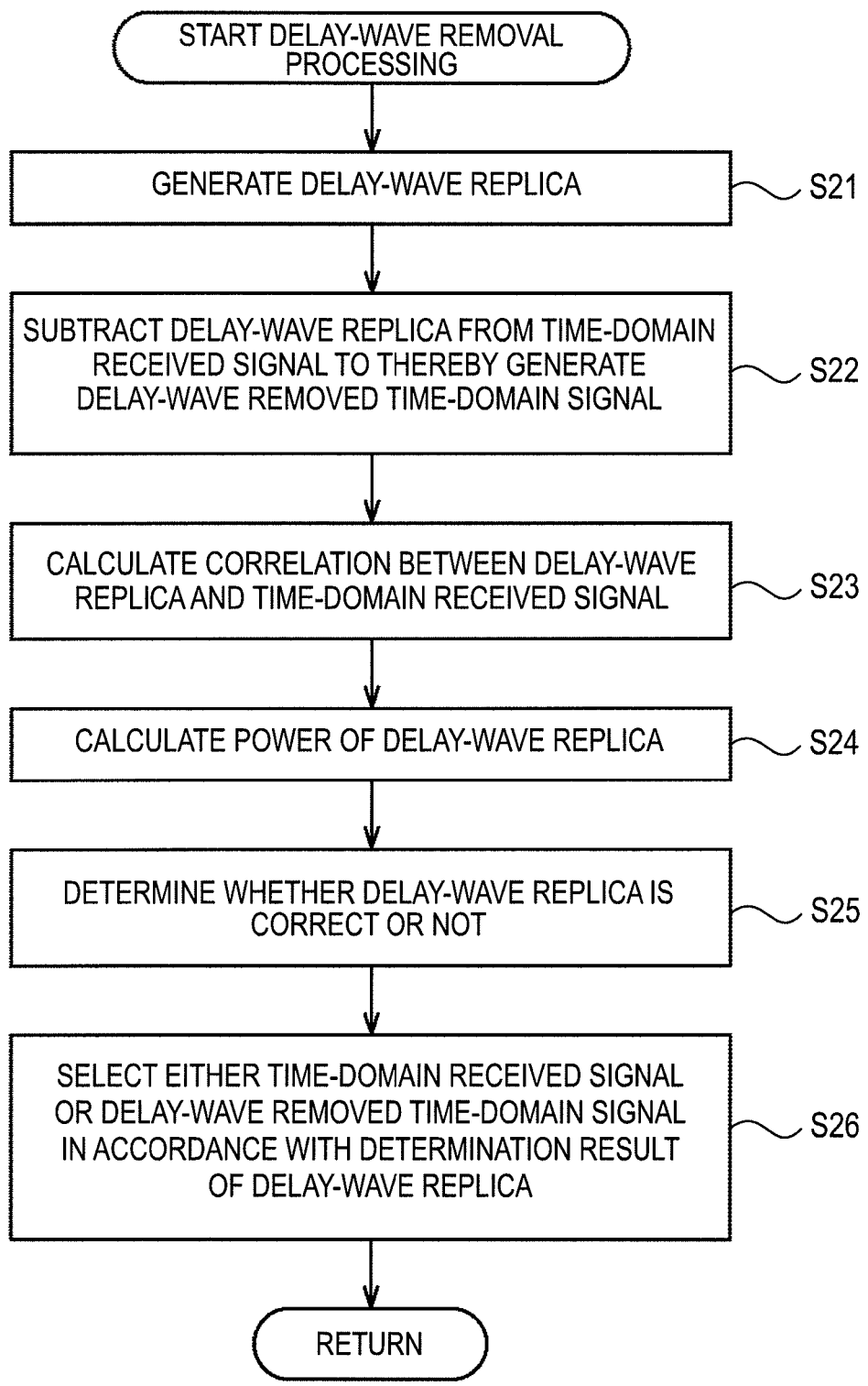
FIG. 8 is a flowchart explaining delay-wave removal processing performed in Step S2 of FIG. 6.

Next, the delay-wave removal processing performed in Step S2 of FIG. 6 will be explained with reference to a flowchart of FIG. 8.

In Step S21, the variable coefficient FIR filter 22 performs filtering to the delay-wave removed time-domain signal generated by the subtraction unit 21 to thereby generate a delay-wave replica.

In Step S22, the subtraction unit 21 subtracts the delay-wave replica generated by the variable coefficient FIR filter 22 from the time-domain received signal to thereby generate a delay-wave removed time-domain signal.

In Step S23, the correlation calculation unit 56 calculates a correlation value between the time-domain received signal and the delay-wave replica generated by the variable coefficient FIR filter 22.

In Step S24, the power calculation unit 57 calculates a power value of the delay-wave replica generated by the variable coefficient FIR filter 22.

In Step S25, the replica determination unit 58 determines whether the delay-wave replica is correct or not based on the correlation value calculated by the correlation calculation unit 56 and the power value of the delay-wave replica calculated by the power calculation unit 57 as described above.

In Step S26, the selection unit 55 selects either the time-domain received signal selected by the selection unit 51 or the delay-wave removed time-domain signal generated by the subtraction unit 21 in accordance with the determination result by the replica determination unit 58, outputting the signal. After that, the process returns to Step S2 of FIG. 6, and the equalization processing ends.

According to the above processing, it is possible to prevent multipath from being newly added by performing subtraction processing by using a replica of an incorrect multipath component.

Second Embodiment

Configuration of Equalizer

A receiving device which receives an OFDM (Orthogonal Frequency Division Muliplex) signal will be explained.

When the received signal is an OFDM signal, processing of removing interference (interference between symbols and interference between carriers) by subtracting the replica of the multipath component from the time-domain received signal can be performed only to a section receiving interference due to multipath.

Figure 9:
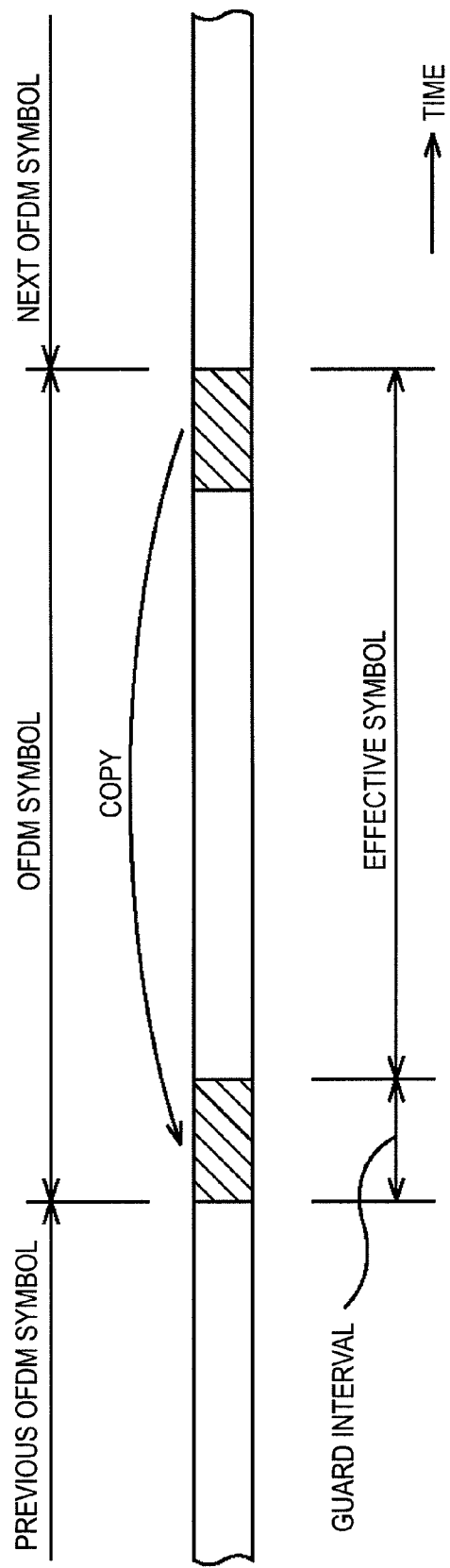
FIG. 9 is a view showing an OFDM symbol.

FIG. 9 is a view showing an OFDM symbol.

In an OFDM system, signal transmission is performed by a unit called an OFDM symbol (hereinafter, appropriately referred to as a merely symbol.

A symbol includes an effective symbol and a guard interval (hereinafter, referred to as a GI). The effective symbol indicates a signal section to which an inverse fast Fourier transform (IFFT) is performed in the transmission side. The GI indicates a signal section in which a waveform of part of last half of the effective symbol is copied. Since data is assigned to plural sub-carriers, the IFFT is performed in the transmission side and a fast Fourier transform (FFT) is performed in the reception side with respect to the effective symbol section.

The GI is inserted at a position before the effective symbol on the time axis. When delay time of multipath included in the received OFDM signal is within the GI, orthogonality is kept with respect to a signal in the FFT section by appropriately selecting the section to which the FFT is performed in the reception side, therefore, the signal is not affected by multipath.

Figure 10:
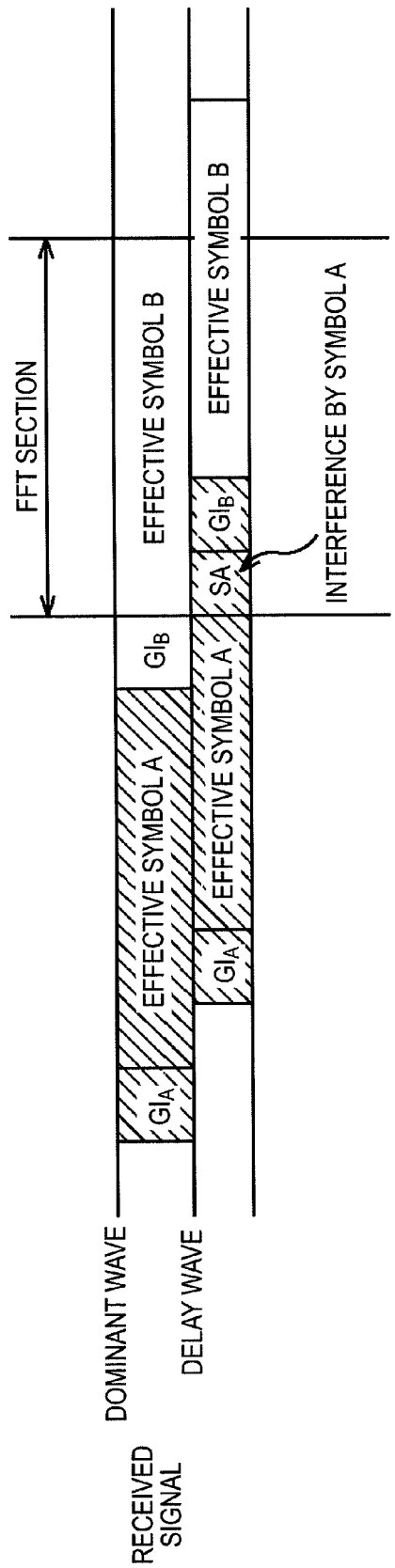
FIG. 10 is a view showing interference by multipath.

On the other hand, when delay time of multipath exceeds the GI, part of another symbol enters the FFT section and the orthogonality is lost, as a result, receiving performance significantly deteriorates, as shown in FIG. 10.

FIG. 10 show an OFDM signal received in a multipath environment in which only one delay wave exists. A symbol "A" including a "$GI_A$" and an effective symbol "A" is received, then, a symbol "B" including a "$GI_B$" and an effective symbol "B" is received successively, and the FFT section is set with respect to the effective symbol "B" of the dominant wave. In the FFT section, part of the symbol "A" which is shown as a signal SA is included.

The section of the signal SA is a section receiving multipath interference, and it is possible to perform processing of removing interference only with respect to the section.

Also in this case, new multipath is added when the subtraction processing is performed by using an incorrect replica, which deteriorates receiving performance, therefore, it is necessary to determine whether the replica is correct or not.

Figure 11:
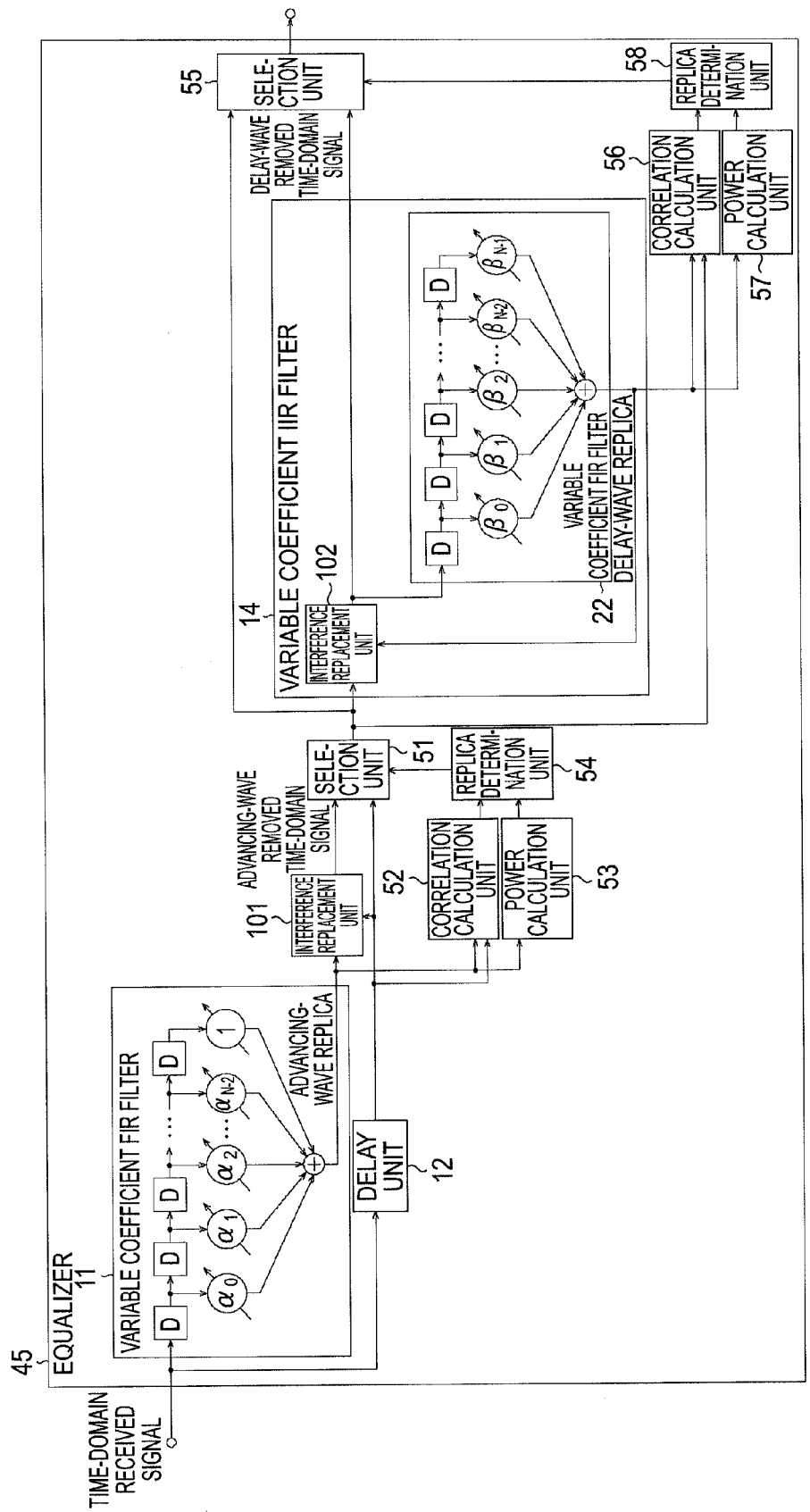
FIG. 11 is a diagram showing another configuration example of the equalizer of FIG. 2.

FIG. 11 is a view showing another configuration example of the equalizer 45.

The equalizer 45 of FIG. 11 is provided at the receiving device 31 of FIG. 2. At a subsequent stage of the equalizer 45 of FIG. 11, a FFT computing unit which is a configuration of performing FFT, a transmission-channel characteristics estimation unit which estimates transmission channel characteristics based on a pilot signal included in the OFDM received signal and the like are provided.

In FIG. 11, the same numerals are given to the same components as the components of FIG. 3. Repeated explanation will be appropriately omitted. The configuration of the equalizer 45 of FIG. 11 is different from the configuration of FIG. 3 in a point that an interference replacement unit 101 is provided instead of the subtraction unit 13 and an interference replacement unit 102 is provided instead of the subtraction unit 21.

To the interference replacement units 101, 102, information indicating the FFT section in each symbol is supplied from the not-shown FFT computing unit, and information indicating transmission channel characteristics is supplied from the transmission-channel characteristics estimation unit. The information indicating transmission channel characteristics such as delay spread is used for determining whether the FFT section of a processing target is a section receiving interference or not, or used for adjusting timing of signals correctly.

The interference replacement unit 101 replaces a signal in a section receiving interference, which is included in the time-domain received signal supplied from the delay unit 12 by an advancing-wave replica generated by the variable coefficient FIR filter 11, outputting a signal in which part of the signal is replaced by the advancing-wave replica.

Figure 12:
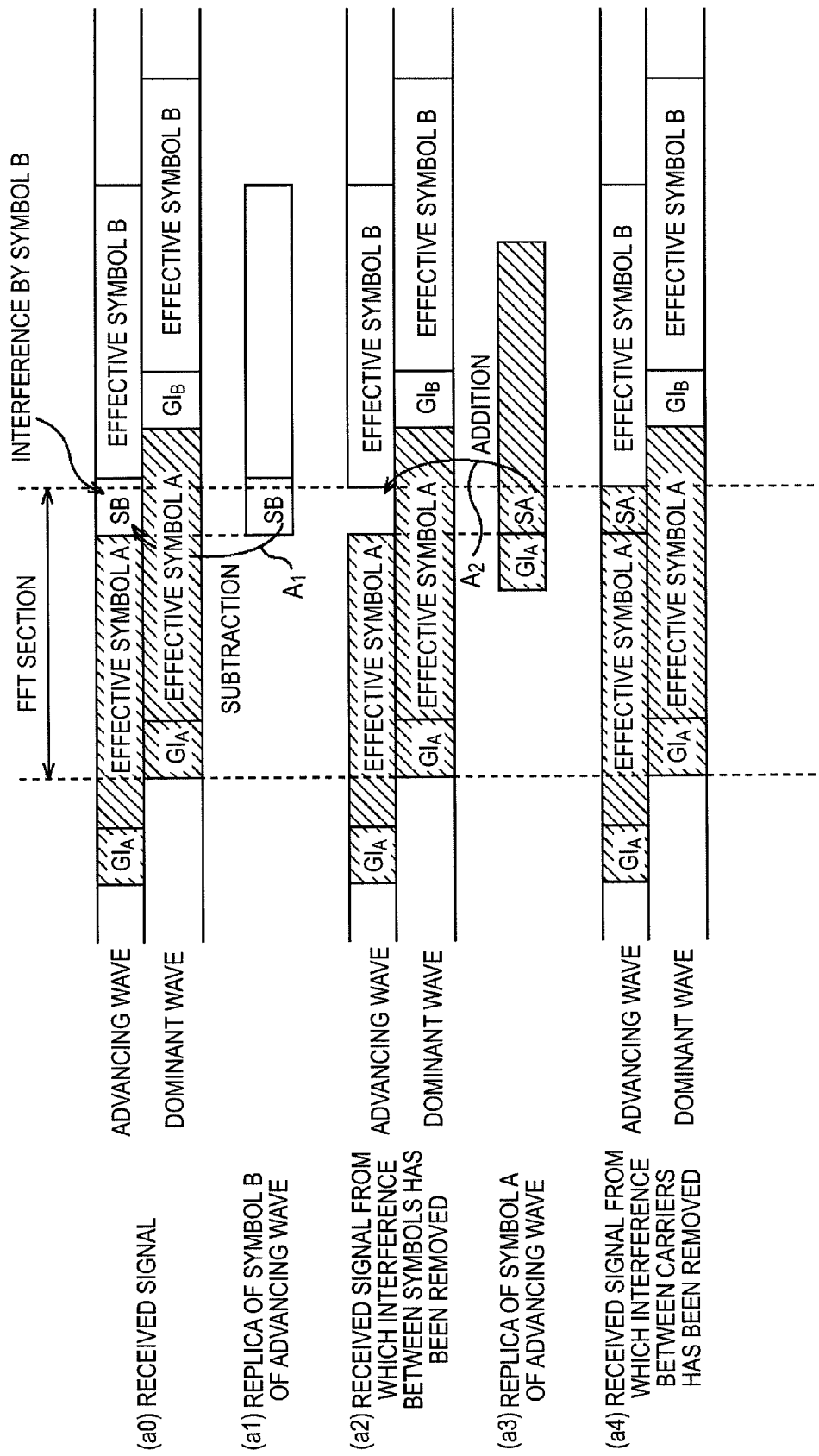
FIG. 12 shows an example of signal replacement by an interference replacement unit of FIG. 11.

FIG. 12 shows an example of signal replacement by the interference replacement unit 101.

(a0) in FIG. 12 represents a time-domain received signal supplied to the interference replacement unit 101. The symbol "A" including the $GI_A$ and the effective symbol "A" is transmitted, then, the symbol "B" including the $GI_B$ and the effective symbol "B" is transmitted successively by the advancing wave and the dominant wave.

In the example of (a0) in FIG. 12, the FFT section is set so that the head of the $GI_A$ of the dominant wave is a start position for decoding the symbol "A", however, the FFT section includes part of the symbol "B" transmitted by the advancing wave, which is shown by a signal SB. The signal SB will be a signal which has to be removed.

(a1) in FIG. 12 represents an advancing-wave replica of the symbol "B" generated by the variable coefficient FIR filter 11. The timing is adjusted so that the head of the advancing-wave replica of the symbol "B" corresponds to the head of the symbol "B" transmitted by the advancing wave.

In the interference replacement unit 101, subtraction is performed with respect to a portion of the signal SB by using the advancing-wave replica of the symbol "B" as shown by an arrow $A_1$.

(a2) in FIG. 12 represents the subtraction result by using the advancing-wave replica of the symbol "B". As shown in (a2) in FIG. 12, the signal SB included in the FFT section is removed from the time-domain received signal, thereby removing the interference between symbols by the symbol "B".

(a3) in FIG. 12 represents an advancing-wave replica of the symbol "A" generated by the variable coefficient FIR filter 11 before the advancing-wave replica of the symbol "B".

In the interference replacement unit 101, the timing of the advancing-wave replica of the symbol "A" is adjusted so that a section receiving interference between symbols in the time-domain received signal corresponds to a section of the signal SA of the advancing-wave replica which is the corresponding signal (same signal). When the advancing-wave replica is correct, the signal SA of the advancing-wave replica will be the same signal as a signal in a section not included in the FFT section of the effective symbol "A" transmitted by the advancing wave.

As shown by an arrow $A_2$, only the portion of the signal SA of the advancing-wave replica of the symbol "A" is added to the time-domain received signal.

(a4) in FIG. 12 represents an addition result by using the advancing-wave replica of the symbol "A". Only the symbol "A" is included in the FFT section, and a signal shown in (a4) in FIG. 12 is a signal after the interference between carriers is removed. The signal from which the interference between carriers has been removed is outputted from the interference replacement unit 101 as an advancing-wave removed time-domain signal and supplied to the selection unit 51.

Figure 13:
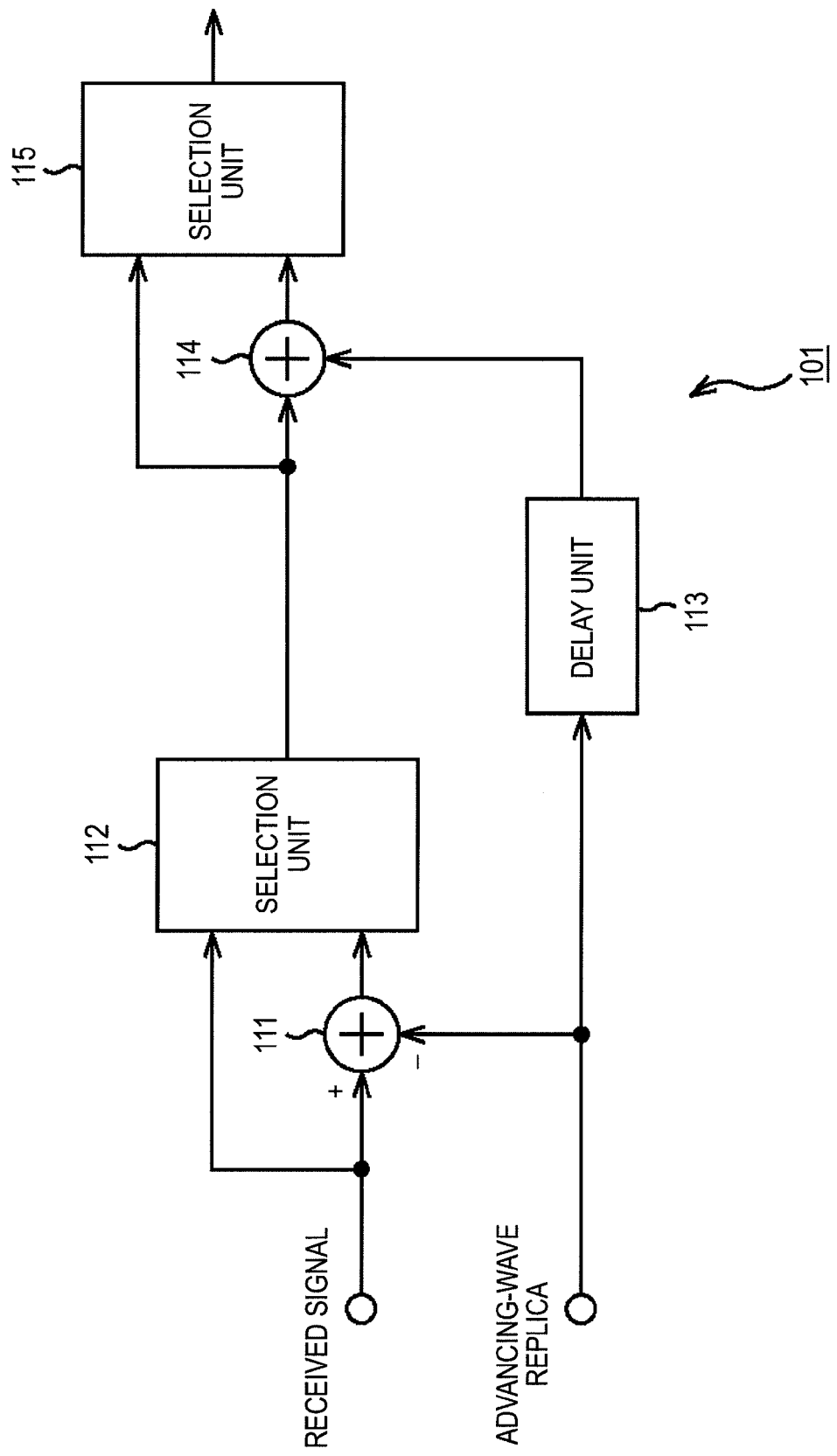
FIG. 13 is a diagram showing a configuration example of the interference replacement unit.

FIG. 13 is a diagram showing a configuration example of the interference replacement unit 101 performing replacement processing of a signal as shown in FIG. 12.

The interference replacement unit 101 includes a subtraction unit 111, a selection unit 112, a delay unit 113, an adding unit 114 and a selection unit 115.

The time-domain received signal outputted from the delay unit 12 is inputted to the subtraction unit 111 and the selection unit 112, and the advancing-wave replica outputted from the variable coefficient FIR filter 11 is inputted to the subtraction unit 111 and the delay unit 113. As shown in (a1) in FIG. 12, the advancing-wave replica is inputted, the timing of which is adjusted so that timing of the signal SB as the signal in the section receiving the interference between symbols by the advancing wave corresponds to timing of the signal SB of the advancing-wave replica.

The subtraction unit 111 subtracts the signal SB from the time-domain received signal by using the advancing-wave replica as shown in (a1) in FIG. 12, outputting the subtraction result. The time-domain received signal as shown in (a2) in FIG. 12 is supplied from the subtraction unit 111 to the selection unit 112.

The selection unit 112 selects the time-domain received signal supplied from the subtraction unit 111 when the processing target is a symbol in which the section receiving the interference between symbols is included in the FFT section, outputting the signal. The selection unit 112 selects the time-domain received signal supplied from the delay unit 12 when the processing target is a symbol in which the section receiving the interference between symbols is not included in the FFT section, outputting the signal. The time-domain received signal outputted from the selection unit 112 is supplied to the adding unit 114 and the selection unit 115.

The delay unit 113 delays the advancing-wave replica supplied from the variable coefficient FIR filter 11 and outputs the signal. In the delay unit 113, the timing of the advancing-wave replica is adjusted so that the section receiving the interference between symbols in the FFT section of each symbol of the time-domain received signal corresponds to the section of corresponding advancing-wave replica as shown in (a3) in FIG. 12. The advancing-wave replica outputted from the delay unit 113 is supplied to the adding unit 114.

The addition unit 114 adds part of the advancing-wave replica to the time-domain received signal supplied from the selection unit 112 as shown in (a3) in FIG. 12, outputting the addition result. The time-domain received signal as shown in (a4) in FIG. 12 is supplied from the addition unit 114 to the selection unit 115.

The selection unit 115 selects the time-domain received signal supplied from the addition unit 114 when the processing target is a symbol in which the section receiving the interference between symbols is included in the FFT section, outputting the signal. The selection unit 115 selects the time-domain received signal supplied from the selection unit 112 when the processing target is a symbol in which the section receiving the interference between symbols is not included in the FFT section. The time-domain received signal selected by the selection unit 115 is inputted to the selection unit 51 as an advancing-wave removed time-domain signal.

Next, the signal replacement by the interference replacement unit 102 in FIG. 11 will be explained.

The interference replacement unit 102 replaces the signal in a section receiving interference, which is included in the time-domain received signal supplied from the selection unit 51 by a delay-wave replica generated by the variable coefficient FIR filter 22, outputting a signal in which part of the signal is replaced by the delay-wave replica.

Figure 14:
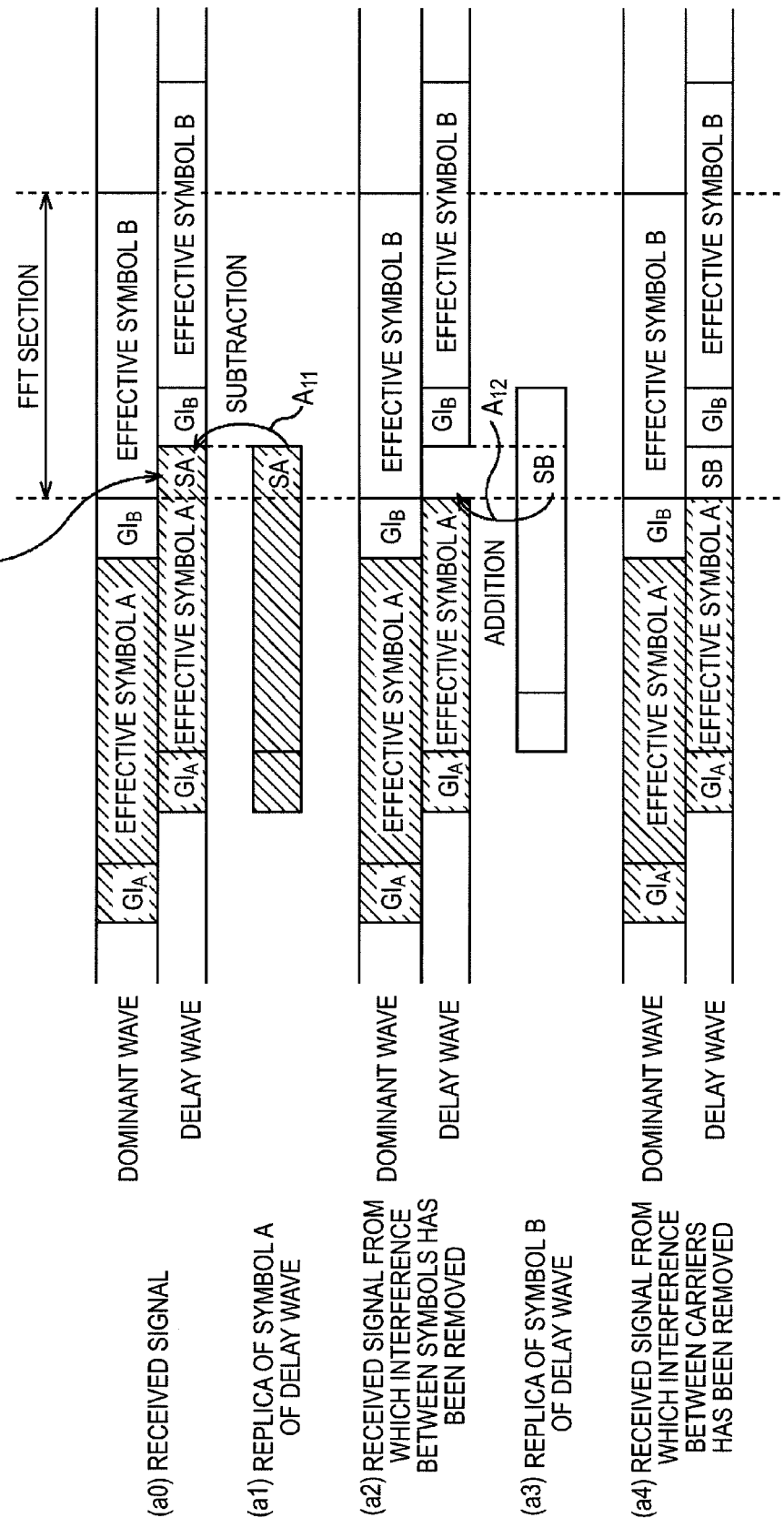
FIG. 14 shows an example of signal replacement by an interference replacement unit of FIG. 11.

FIG. 14 shows an example of signal replacement by the interference replacement unit 102.

(a0) in FIG. 14 represents a time-domain received signal supplied to the interference replacement unit 102. The symbol "A" including the $GI_A$ and the effective symbol "A" is transmitted, then, the symbol "B" including the $GI_B$ and the effective symbol B is transmitted successively by the delay wave and the dominant wave.

In the example of (a0) in FIG. 14, the FFT section is set so that the head of the effective symbol "B" of the dominant wave is a start position for decoding the symbol "B", however, the FFT section includes part of the symbol "A" transmitted by the delay wave, which is shown by a signal SA. The signal SA will be a signal which has to be removed.

(a1) in FIG. 14 represents a delay-wave replica of the symbol "A" generated by the variable coefficient FIR filter 22. The timing is adjusted so that the head of the delay-wave replica of the symbol "A" corresponds to the head of the symbol "A" transmitted by the delay wave.

In the interference replacement unit 102, subtraction is performed with respect to a portion of the signal SA by using the delay-wave replica of the symbol "A" as shown by an arrow $A_{11}$.

(a2) in FIG. 14 represents the subtraction result by using the delay-wave replica of the symbol "A". As shown in (a2) in FIG. 14, the signal SA included in the FFT section is removed, thereby removing the interference between symbols by the symbol "A".

(a3) in FIG. 14 represents a delay-wave replica of the symbol "B" generated by the variable coefficient FIR filter 22.

In the interference replacement unit 102, the timing of the delay-wave replica of the symbol "B" is adjusted so that a section receiving interference between symbols in the time-domain received signal corresponds to a section of the signal SB of the delay-wave replica which is the corresponding signal. When the delay-wave replica is correct, the signal SB of the delay-wave replica will be the same signal as a signal in a section not included in the FFT section of the effective symbol "B" transmitted by the delay wave.

As shown by an arrow $A_{12}$, only the portion of the signal SB of the delay-wave replica of the symbol "B" is added to the time-domain received signal.

(a4) in FIG. 14 represents an addition result by using the delay-wave replica of the symbol "B". Only the symbol "B" is included in the FFT section, and a signal shown in (a4) in FIG. 14 is a signal after the interference between carriers is removed. The signal from which the interference between carriers has been removed is outputted from the interference replacement unit 102 as a delay-wave removed time-domain signal and supplied to the variable coefficient FIR filter 22 and the selection unit 55.

Figure 15:
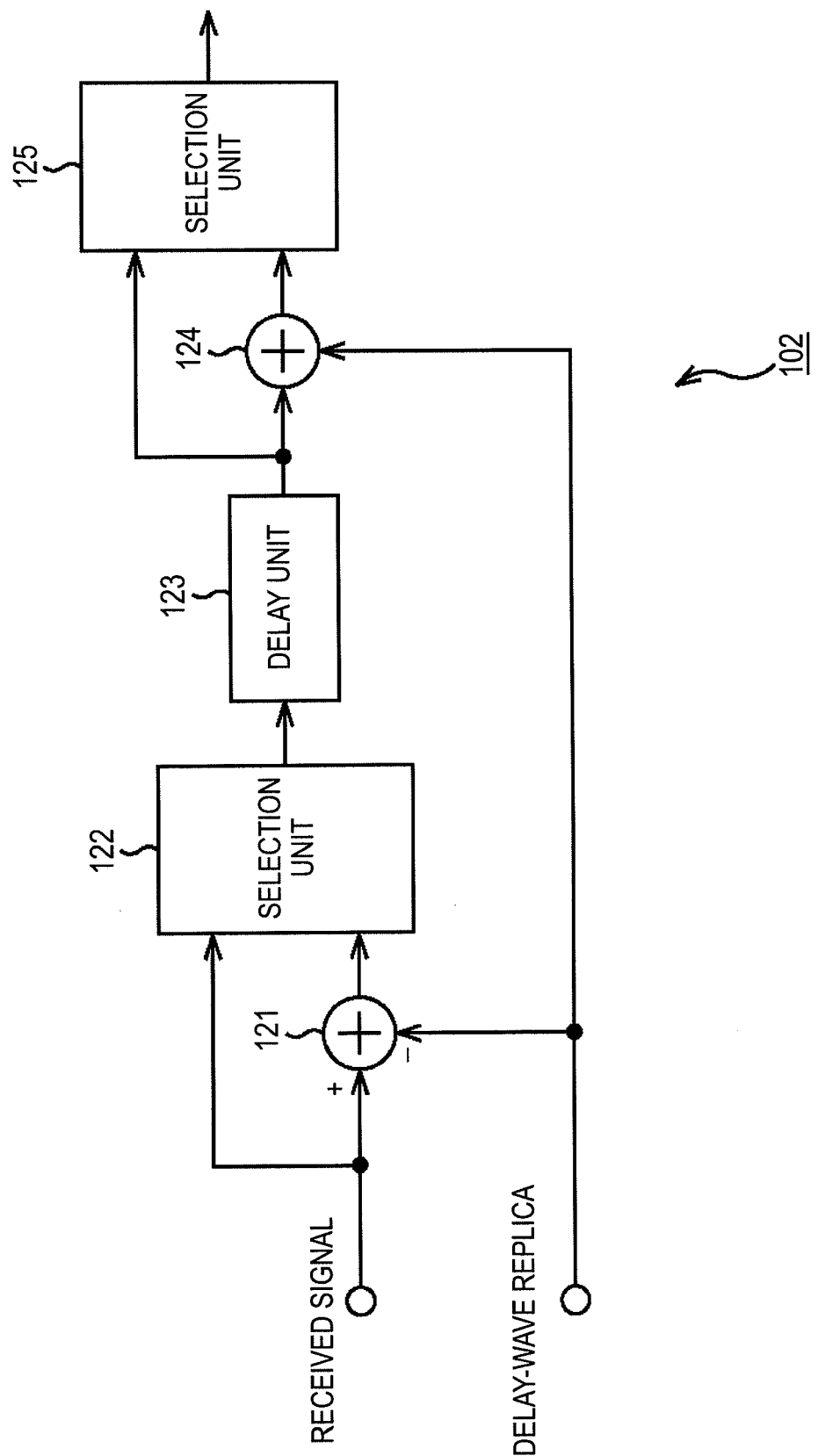
FIG. 15 is a diagram showing a configuration example of the interference replacement unit.

FIG. 15 is a diagram showing a configuration example of the interference replacement unit 102 performing replacement processing of a signal as shown in FIG. 14.

The interference replacement unit 102 includes a subtraction unit 121, a selection unit 122, a delay unit 123, an adding unit 124 and a selection unit 125.

The time-domain received signal outputted from the selection unit 51 is inputted to the subtraction unit 121 and the selection unit 122, and the delay-wave replica outputted from the variable coefficient FIR filter 22 is inputted to the subtraction unit 121 and the adding unit 124. As shown in (a1) in FIG. 14, the delay-wave replica is inputted, the timing of which is adjusted so that timing of the signal SA as a signal in a section receiving the interference between symbols by the delay wave corresponds to timing of the signal SA of the delay-wave replica.

The subtraction unit 121 subtracts the signal SA from the time-domain received signal by using the advancing-wave replica as shown in (a1) in FIG. 14, outputting the subtraction result. The time-domain received signal as shown in (a2) in FIG. 14 is supplied from the subtraction unit 121 to the selection unit 122.

The selection unit 122 selects the time-domain received signal supplied from the subtraction unit 121 when the processing target is a symbol in which the section receiving the interference between symbols is included in the FFT section, outputting the signal. The selection unit 122 selects the time-domain received signal supplied from the selection unit 51 when the processing target is a symbol in which the section receiving the interference between symbols is not included in the FFT section, outputting the signal. The time-domain received signal outputted from the selection unit 122 is supplied to the delay unit 123.

The delay unit 123 delays the time-domain received signal supplied from the selection unit 122 and output the signal. The time-domain received signal outputted from the delay unit 123 is inputted to the addition unit 124 and the selection unit 125. As shown in (a3) in FIG. 14, the timing of the time-domain received signal is adjusted so that the section receiving the interference between symbols in the FFT section of each symbol of the time-domain received signal corresponds to the section of corresponding delay-wave replica.

The addition unit 124 adds part of the delay-wave replica to the time-domain received signal supplied from the delay unit 123 as shown in (a3) in FIG. 14, outputting the addition result. The time-domain received signal as shown in (a4) in FIG. 14 is supplied to the selection unit 125.

The selection unit 125 selects the time-domain received signal supplied from the addition unit 124 when the processing target is a symbol in which the section receiving the interference between symbols is included in the FFT section, outputting the signal. The selection unit 125 selects the time-domain received signal supplied from the delay unit 123 when the processing target is a symbol in which the section receiving the interference between symbols is not included in the FFT section. The time-domain received signal selected by the selection unit 125 is inputted to the variable coefficient FIR filter 22 and the selection unit 55 as a delay-wave removed time-domain signal.

[Operation of Equalizer]

Next, operations of the equalizer 45 having the above configuration will be explained with reference to flowcharts. Processing of in each step is performed in parallel to, or before and after the other processing.

Figure 6:
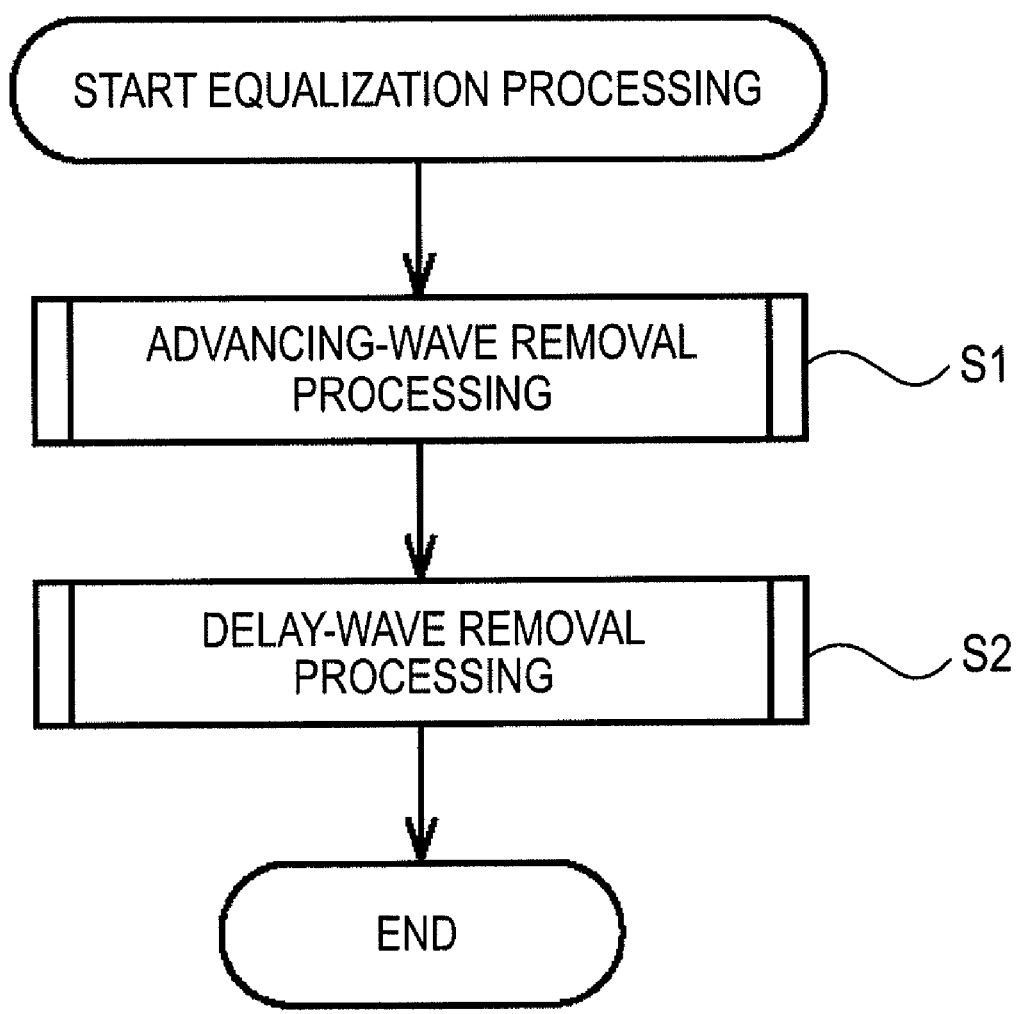
FIG. 6 is a flowchart explaining equalization processing of the equalizer.
Figure 7:
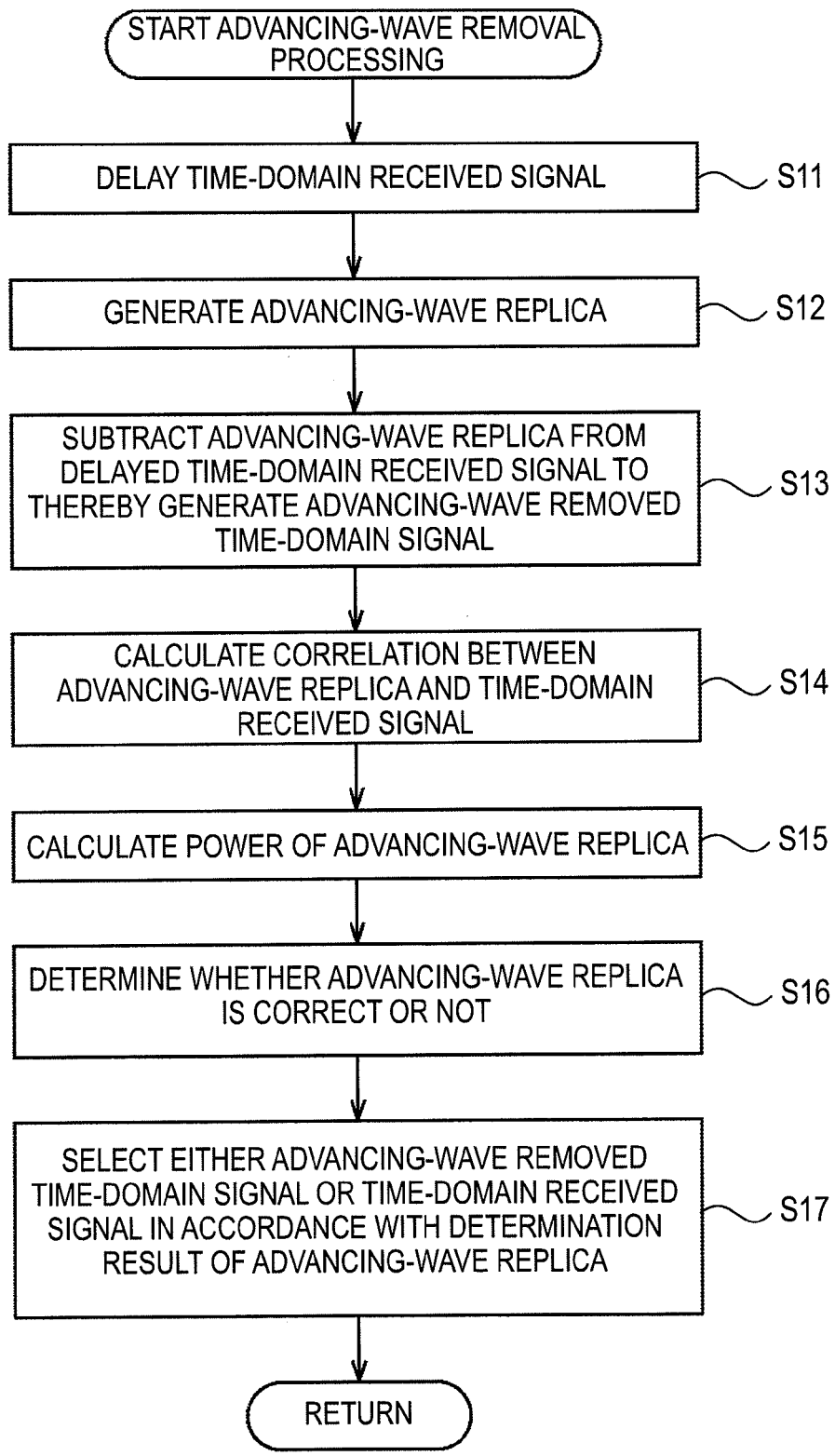
FIG. 7 is a flowchart explaining advancing-wave removal processing performed in Step S1 of FIG. 6.

Also in the equalizer 45 of FIG. 11, the same processing as the equalization processing explained with reference to FIG. 6 is performed. That is, in Step S1, advancing-wave removal processing is performed, and in Step S2, delay-wave removal processing is performed.

Figure 16:
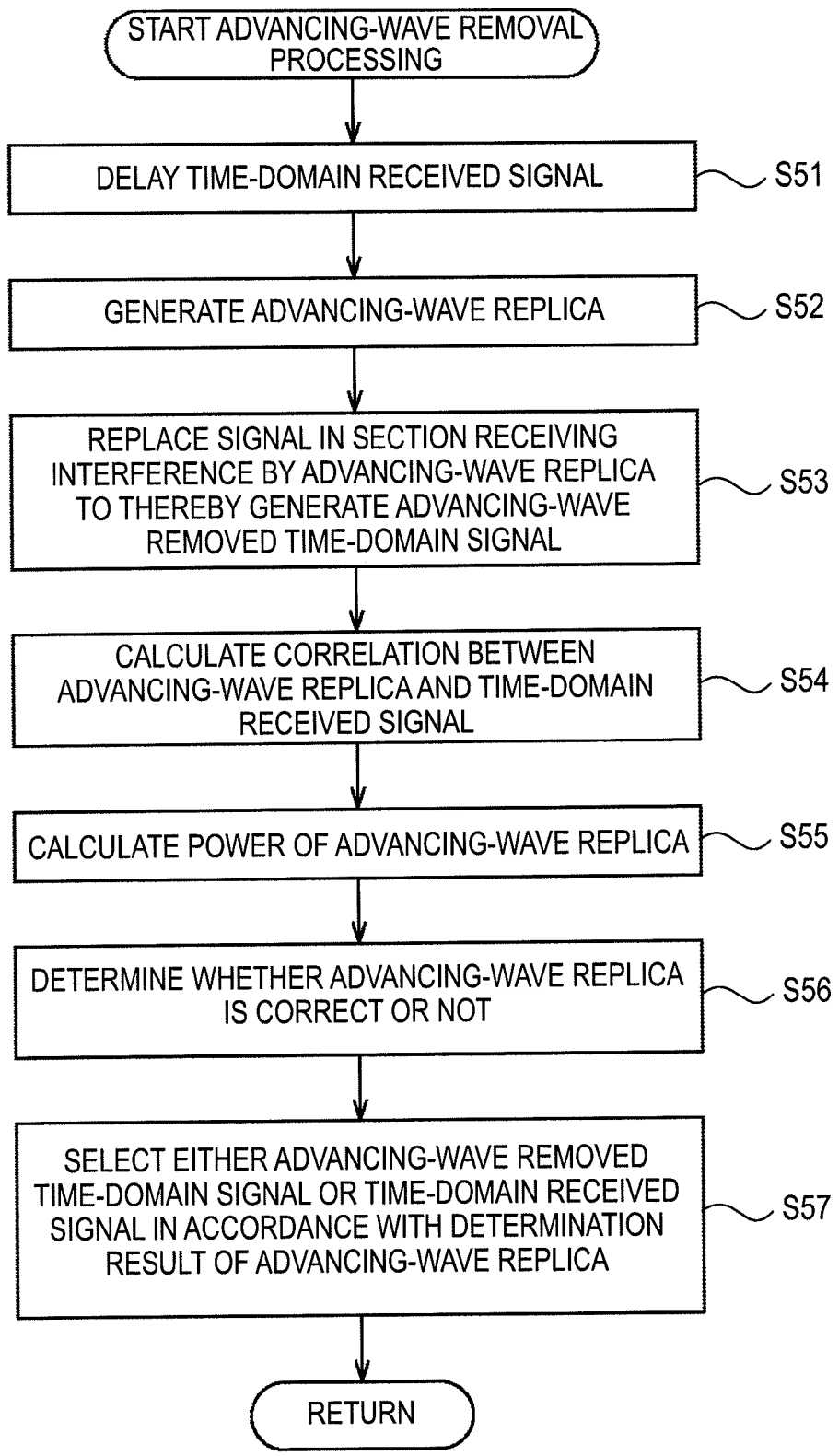
FIG. 16 is a flowchart explaining another advancing-wave removal processing performed in Step S1 of FIG. 6.

The advancing-wave removal processing performed in Step S1 of FIG. 6 by the equalizer 45 of FIG. 11 will be explained with reference to a flowchart of FIG. 16. The processing shown in FIG. 16 is the same processing as the processing explained with reference to FIG. 7 except a point that processing concerning the removal of multipath interference is different.

In Step S51, the delay unit 12 delays the time-domain received signal and outputs the delayed time-domain received signal.

In Step S52, the variable coefficient FIR filter 11 generates an advancing-wave replica by performing filtering using a coefficient generated by the coefficient update circuit.

In Step S53, the interference replacement unit 101 replaces the signal in a section receiving interference included in the time-domain received signal by the advancing-wave replica to thereby generate an advancing-wave removed time-domain signal in the manner as explained with reference to FIG. 12 and the like.

In Step S54, the correlation calculation unit 52 calculates a correlation value between the time-domain received signal and the advancing-wave replica generated by the variable coefficient FIR filter 11.

In Step S55, the power calculation unit 53 calculates a power value of the advancing-wave replica generated by the variable coefficient FIR filter 11.

In Step S56, the replica determination unit 54 determines whether the advancing-wave replica is correct or not based on the correlation value calculated by the correlation calculation unit 52 and the power value of the advancing-wave replica calculated by the power calculation unit 53.

In Step S57, the selection unit 51 selects either the time-domain received signal delayed by the delay unit 12 or the advancing-wave removed time-domain signal generated by the interference replacement unit 101 in accordance with the determination result by the replica determination unit 54, outputting the signal. After that, the process returns to Step S1 of FIG. 6 and processing of Step S2 is performed.

Figure 17:
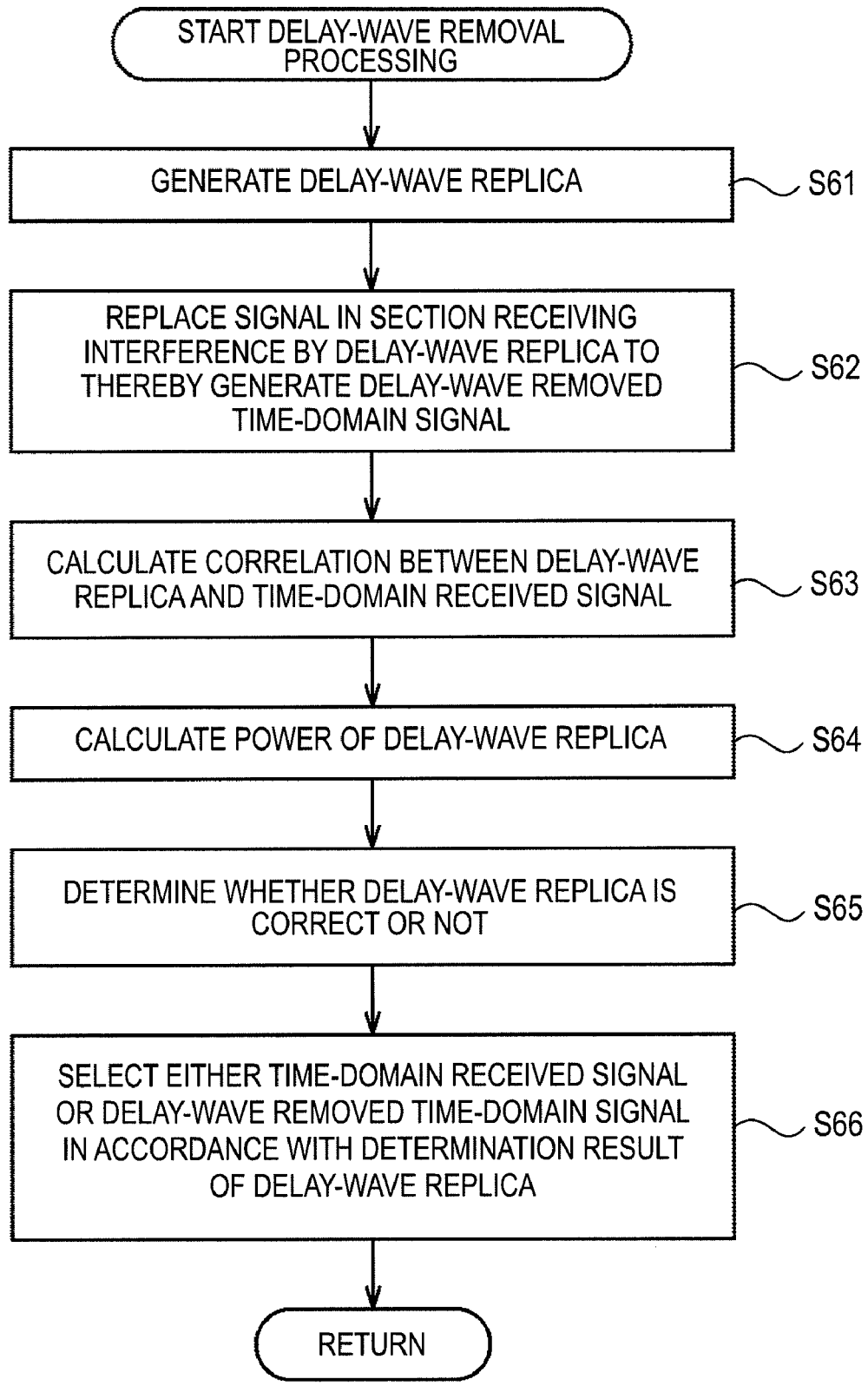
FIG. 17 is a flowchart explaining another delay-wave removal processing performed in Step S2 of FIG. 6.

Next, the delay-wave removal processing performed in Step S2 of FIG. 6 will be explained with reference to a flowchart of FIG. 17.

In Step S61, the variable coefficient FIR filter 22 performs filtering with respect to the delay-wave removed time-domain signal generated by the interference replacement unit 102 to thereby generate the delay-wave replica.

In Step S62, the interference replacement unit 102 replaces the signal in the section receiving interference included in the time-domain received signal by the delay-wave replica to thereby generate the delay-wave removed time-domain signal in the manner as explained with reference to FIG. 14 and the like.

In Step S63, the correlation calculation unit 56 calculates a correlation value between the time-domain received signal and the delay-wave replica generated by the variable coefficient FIR filter 22.

In Step S64, the power calculation unit 57 calculates a power value of the delay-wave replica generated by the variable coefficient FIR filter 22.

In Step S65, the replica determination unit 58 determines whether the delay-wave replica is correct or not based on the correlation value calculated by the correlation calculation unit 56 and the power value of the delay-wave replica calculated by the power calculation unit 57 in the manner as described above.

In Step S66, the selection unit 55 selects either the time-domain received signal selected by the selection unit 51 or the delay-wave removed time-domain signal generated by the interference replacement unit 102 in accordance with the determination result by the replica determination unit 58, outputting the signal. After that, the process returns to Step S2 of FIG. 6 and the equalization processing ends.

As described above, in the equalizer which performs processing only with respect to the section receiving multipath interference included in the FFT section of each symbol of the received OFDM signal, it is possible to prevent the subtraction processing by using a replica of an incorrect multipath component. Accordingly, it is possible to prevent that a new multipath is added.

The above series of processing can be executed by hardware as well as by software. When the series of processing is executed by software, software is installed to a computer in which programs included in the software are incorporated in dedicated hardware or a general-purpose personal computer from a program recording medium.

FIG. 18 is a block diagram showing a configuration example of hardware of a computer executing the above series of processing by programs.

A CPU (Central Processing Unit) 201, a ROM (Read Only Memory) 202, a RAM (Random Access Memory) 203 are connected to one another by a bus 204.

An input/output interface 205 is further connected to the bus 204. An input unit 206 including a keyboard, a mouse and the like as well as an output unit 207 including a display, a speaker and the like are connected to the input/output interface 205. A storage unit 208 including hardware, a non-volatile memory and the like, a communication unit 209 including a network interface and the like and a drive 210 which drives removable media 211 are connected to the bus 204.

In the computer configured as the above, the CPU 201 loads programs stored in, for example, the storage unit 208 to the RAM 203 through the input/output interface 205 and the bus 204 and executes the programs, thereby performing the above series of processing.

The programs executed by the CPU 201 are provided, for example, by being recorded in the removable media 211, or through wired or wireless transmission media such as a local area network, Internet and digital broadcasting, which are installed in the storage unit 208.

The program executed by the computer may be a program in which processing is performed in time series along the order explained in the specification or may be a program in which processing is performed in parallel or in the necessary timing such as when a cell is made or the like.

The embodiment of the invention is not limited to the above embodiments and can be variously modified in a domain not departing from the gist thereof.

The present application contains subject matter related to that disclosed in Japanese Priority Patent Application JP 2008-240274 filed in the Japan Patent Office on Sep. 19, 2008, the entire contents of which is hereby incorporated by reference.

What is claimed is:

1. An equalizer comprising:
a replica generation means for generating a replica of a multipath component by applying an adaptive filter to a received signal which has received multipath interference;
a removal means for generating a multipath-component removed signal which is the received signal from which the multipath component has been removed by subtracting the replica generated by the replica generation means from the received signal;
a correlation value calculation means for calculating a correlation value between the received signal and the replica;
a power value calculation means for calculating a power value of the replica;
a determination means for determining whether the replica generated by the replica generation means is the replica of the multipath component included in the received signal or not based on the correlation value calculated by the correlation value calculation means and the power value calculated by the power value calculation means; and
a selection means for outputting the multipath-component removed signal generated by the removal means when it is determined that the replica generated by the replica generation means is the replica of the multipath component included in the received signal by the determination means, and outputting the received signal when it is determined that the replica generated by the replica generation means is not the replica of the multipath component included in the received signal by the determination means.

2. The equalizer according to claim 1,
wherein the correlation value calculation means calculates accumulation of correlation values between the received signal and the replica at respective time points for given time points,
wherein the power value calculation means calculates accumulation of power values of the replica at respective time points for the given time points,
wherein the determination means determines that the replica generated by the replica generation means is the replica of the multipath component included in the received signal when the ratio between the accumulated result of power values of replica calculated by the power value calculation means and the accumulated result of correlation values of the replica calculated by the correlation value calculation means exceeds a reference value.

3. An equalization method comprising the steps of:
generating a replica of a multipath component by applying an adaptive filter to a received signal which has received multipath interference;
generating a multipath-component removed signal which is the received signal from which the multipath component has been removed by subtracting the generated replica generated from the received signal;
calculating a correlation value between the received signal and the replica;
calculating a power value of the replica;
determining whether the generated replica is the replica of the multipath component included in the received signal or not based on the calculated correlation value and the power value; and
outputting the multipath-component removed signal when it is determined that the replica is the replica of the multipath component included in the received signal, and outputting the received signal when it is determined that the replica is not the replica of the multipath component included in the received signal.

4. A program allowing a computer to execute processing comprising the steps of:
generating a replica of a multipath component by applying an adaptive filter to a received signal which has been received multipath interference;
generating a multipath-component removed signal which is the received signal from which the multipath component has been removed by subtracting the generated replica generated from the received signal;
calculating a correlation value between the received signal and the replica;
calculating a power value of the replica;
determining whether the generated replica is the replica of the multipath component included in the received signal or not based on the calculated correlation value and the power value; and
outputting the multipath-component removed signal when it is determined that the replica is the replica of the multipath component included in the received signal, and outputting the received signal when it is determined that the replica is not the replica of the multipath component included in the received signal.

5. A receiving device comprising:
an equalizer including
a replica generation means for generating a replica of a multipath component by applying an adaptive filter to a received signal which has received multipath interference;

a removal means for generating a multipath-component removed signal which is the received signal from which the multipath component has been removed by subtracting the replica generated by the replica generation means from the received signal;

a correlation value calculation means for calculating a correlation value between the received signal and the replica;

a power value calculation means for calculating a power value of the replica;

a determination means for determining whether the replica generated by the replica generation means is the replica of the multipath component included in the received signal or not based on the correlation value calculated by the correlation value calculation means and the power value calculated by the power value calculation means; and a selection means for outputting the multipath-component removed signal generated by the removal means when it is determined that the replica generated by the replica generation means is the replica of the multipath component included in the received signal by the determination means, and outputting the received signal when it is determined that the replica generated by the replica generation means is not the replica of the multipath component included in the received signal by the determination means.

6. An equalizer comprising:

a replica generation means for generating a replica of a multipath component by applying an adaptive filter to an OFDM received signal which has received multipath interference;

a replacement means for generating a multipath-component removed signal which is the OFDM received signal from which the multipath component has been removed by replacing a signal in a section receiving multipath interference in a FFT section set with respect to each symbol of the OFDM received signal with a signal in a section of the replica generated by the replica generation means, which corresponding to the above section;

a correlation value calculation means for calculating a correlation value between the OFDM received signal and the replica;

a power value calculation means for calculating a power value of the replica;

a determination means for determining whether the replica generated by the replica generation means is the replica of the multipath component included in the OFDM received signal or not based on the correlation value calculated by the correlation value calculation means and the power value calculated by the power value calculation means; and a selection means for outputting the multipath-component removed signal generated by the replacement means when it is determined that the replica generated by the replica generation means is the replica of the multipath component included in the OFDM received signal by the determination means, and outputting the OFDM received signal when it is determined that the replica generated by the replica generation means is not the replica of the multipath component included in the OFDM received signal by the determination means.

7. The equalizer according to claim 6, wherein the correlation value calculation means calculates accumulation of correlation values between the OFDM received signal and the replica at respective time points for given time points, wherein the power value calculation means calculates accumulation of power values of the replica at respective time points for the given time points, wherein the determination means determines that the replica generated by the replica generation means is the replica of the multipath component included in the OFDM received signal when the ratio between the accumulated result of power values of replica calculated by the power value calculation means and the accumulated result of correlation values of the replica calculated by the correlation value calculation means exceeds a reference value.

8. An equalization method comprising the steps of:

generating a replica of a multipath component by applying an adaptive filter to an OFDM received signal which has received multipath interference;

generating a multipath-component removed signal which is the OFDM received signal from which the multipath component has been removed by replacing a signal in a section receiving multipath interference in a FFT section set with respect to each symbol of the OFDM received signal with a signal in a section of the replica, which corresponding to the above section;

calculating a correlation value between the OFDM received signal and the replica;

calculating a power value of the replica;

determining whether the generated replica is the replica of the multipath component included in the OFDM received signal or not based on the calculated correlation value and the power value; and outputting the multipath-component removed signal when it is determined that the replica is the replica of the multipath component included in the OFDM received signal, and outputting the OFDM received signal when it is determined that the replica is not the replica of the multipath component included in the OFDM received signal.

9. A program allowing a computer to execute processing comprising the steps of:

generating a replica of a multipath component by applying an adaptive filter to an OFDM received signal which has received multipath interference;

generating a multipath-component removed signal which is the OFDM received signal from which the multipath component has been removed by replacing a signal in a section receiving multipath interference in a FFT section set with respect to each symbol of the OFDM received signal with a signal in a section of the replica, which corresponding to the above section;

calculating a correlation value between the OFDM received signal and the replica;

calculating a power value of the replica;

determining whether the generated replica is the replica of the multipath component included in the OFDM received signal or not based on the calculated correlation value and the power value; and outputting the multipath-component removed signal when it is determined that the replica is the replica of the multipath component included in the OFDM received signal, and outputting the OFDM received signal when it is determined that the replica is not the replica of the multipath component included in the OFDM received signal.

10. A receiving device comprising:
an equalizer including
a replica generation means for generating a replica of a multipath component by applying an adaptive filter to an OFDM received signal which has received multipath interference;
a replacement means for generating a multipath-component removed signal which is the OFDM received signal from which the multipath component has been removed by replacing a signal in a section receiving multipath interference in a FFT section set with respect to each symbol of the OFDM received signal with a signal in a section of the replica generated by the replica generation means, which corresponding to the above section;
a correlation value calculation means for calculating a correlation value between the OFDM received signal and the replica;
a power value calculation means for calculating a power value of the replica;
a determination means for determining whether the replica generated by the replica generation means is the replica of the multipath component included in the OFDM received signal or not based on the correlation value calculated by the correlation value calculation means and the power value calculated by the power value calculation means; and
a selection means for outputting the multipath-component removed signal generated by the replacement means when it is determined that the replica generated by the replica generation means is the replica of the multipath component included in the OFDM received signal by the determination means, and outputting the OFDM received signal when it is determined that the replica generated by the replica generation means is not the replica of the multipath component included in the OFDM received signal by the determination means.

11. An equalizer comprising:
a replica generation unit configured to generate a replica of a multipath component by applying an adaptive filter to a received signal which has received multipath interference;
a removal unit configured to generate a multipath-component removed signal which is the received signal from which the multipath component has been removed by subtracting the replica generated by the replica generation unit from the received signal;
a correlation value calculation unit configured to calculate a correlation value between the received signal and the replica;
a power value calculation unit configured to calculate a power value of the replica;
a determination unit configured to determine whether the replica generated by the replica generation unit is the replica of the multipath component included in the received signal or not based on the correlation value calculated by the correlation value calculation unit and the power value calculated by the power value calculation unit; and
a selection unit configured to output the multipath-component removed signal generated by the removal unit when it is determined that the replica generated by the replica generation unit is the replica of the multipath component included in the received signal by the determination unit, and output the received signal when it is determined that the replica generated by the replica generation unit is not the replica of the multipath component included in the received signal by the determination unit.

12. A receiving device comprising:
an equalizer including
a replica generation unit configured to generate a replica of a multipath component by applying an adaptive filter to a received signal which has received multipath interference;
a removal unit configured to generate a multipath-component removed signal which is the received signal from which the multipath component has been removed by subtracting the replica generated by the replica generation unit from the received signal;
a correlation value calculation unit configured to calculate a correlation value between the received signal and the replica;
a power value calculation unit configured to calculate a power value of the replica;
a determination unit configured to determine whether the replica generated by the replica generation unit is the replica of the multipath component included in the received signal or not based on the correlation value calculated by the correlation value calculation unit and the power value calculated by the power value calculation unit; and
a selection unit configured to output the multipath-component removed signal generated by the removal unit when it is determined that the replica generated by the replica generation unit is the replica of the multipath component included in the received signal by the determination unit, and output the received signal when it is determined that the replica generated by the replica generation unit is not the replica of the multipath component included in the received signal by the determination unit.

13. An equalizer comprising:
a replica generation unit configured to generate a replica of a multipath component by applying an adaptive filter to an OFDM received signal which has received multipath interference;
a replacement unit configured to generate a multipath-component removed signal which is the OFDM received signal from which the multipath component has been removed by replacing a signal in a section receiving multipath interference in a FFT section set with respect to each symbol of the OFDM received signal with a signal in a section of the replica generated by the replica generation unit, which corresponding to the above section;
a correlation value calculation unit configured to calculate a correlation value between the OFDM received signal and the replica;
a power value calculation unit configured to calculate a power value of the replica;
a determination unit configured to determine whether the replica generated by the replica generation unit is the replica of the multipath component included in the OFDM received signal or not based on the correlation value calculated by the correlation value calculation unit and the power value calculated by the power value calculation unit; and
a selection unit configured to output the multipath-component removed signal generated by the replacement unit when it is determined that the replica generated by the replica generation unit is the replica of the multipath component included in the OFDM received signal by the determination means, and output the OFDM received signal when it is determined that the replica generated by the replica generation unit is not the replica of the multipath component included in the OFDM received signal by the determination unit.

14. A receiving device comprising:

an equalizer including a replica generation unit configured to generate a replica of a multipath component by applying an adaptive filter to an OFDM received signal which has received multipath interference;

a replacement unit configured to generate a multipath-component removed signal which is the OFDM received signal from which the multipath component has been removed by replacing a signal in a section receiving multipath interference in a FFT section set with respect to each symbol of the OFDM received signal with a signal in a section of the replica generated by the replica generation unit, which corresponding to the above section;

a correlation value calculation unit configured to calculate a correlation value between the OFDM received signal and the replica;

a power value calculation unit configured to calculate a power value of the replica;

a determination unit configured to determine whether the replica generated by the replica generation unit is the replica of the multipath component included in the OFDM received signal or not based on the correlation value calculated by the correlation value calculation unit and the power value calculated by the power value calculation unit; and a selection unit configured to output the multipath-component removed signal generated by the replacement unit when it is determined that the replica generated by the replica generation unit is the replica of the multipath component included in the OFDM received signal by the determination unit, and output the OFDM received signal when it is determined that the replica generated by the replica generation unit is not the replica of the multipath component included in the OFDM received signal by the determination unit.

* * * * *